(12) United States Patent
Hinshaw et al.

(10) Patent No.: US 7,305,386 B2
(45) Date of Patent: Dec. 4, 2007

(54) CONTROLLING VISIBILITY IN MULTI-VERSION DATABASE SYSTEMS

(75) Inventors: Foster D. Hinshaw, Somerville, MA (US); Craig S. Harris, Acton, MA (US); Sunil K. Sarin, Newton, MA (US)

(73) Assignee: Netezza Corporation, Framingham, MA (US)

( * ) Notice: Subject to any disclaimer, the term of this patent is extended or adjusted under 35 U.S.C. 154(b) by 277 days.

(21) Appl. No.: 10/646,522

(22) Filed: Aug. 22, 2003

(65) Prior Publication Data

US 2004/0249838 A1 Dec. 9, 2004

Related U.S. Application Data

(60) Provisional application No. 60/410,727, filed on Sep. 13, 2002.

(51) Int. Cl.
  *G06F 17/30* (2006.01)
  *G06F 7/00* (2006.01)
(52) U.S. Cl. .............................. 707/4; 707/10; 707/203; 707/102
(58) Field of Classification Search .................... 707/4, 707/100, 10
  See application file for complete search history.

(56) References Cited

U.S. PATENT DOCUMENTS 5,701,480 A 12/1997 Raz 6,128,642 A * 10/2000 Doraswamy et al. ....... 709/201
6,192,377 B1 2/2001 Ganesh et al.
6,237,001 B1 * 5/2001 Bamford et al. ............ 707/100
6,957,236 B1 * 10/2005 Ganesh et al. .............. 707/204

OTHER PUBLICATIONS

Mohan, C., et al., "Efficient and Flexible Methods for Transient Versioning of Records to Avoid Locking by Read-Only Transactions," 124-133, 1992.
Bernstein, P.A., et al., "Multiversion Concurrency Control," Addison-Wesley Publishing Company, 143-166, 1987.
Berenson, H., et al., "A Critique of ANSI SQL Isolation Levels," *SIGMOD '95*.

* cited by examiner

*Primary Examiner*—John Cottingham
*Assistant Examiner*—Kimberly Lovel
(74) *Attorney, Agent, or Firm*—Hamilton, Brook, Smith & Reynolds, P.C.

(57) ABSTRACT

A multi-version database system controls visibility of data during transaction processing. A transaction includes a transaction identifier that identifies the transaction and an invisibility list of transactions whose effects are invisible to the transaction. Changes made by other transactions are visible to the transaction based on the isolation level of the transaction. Records are visible to a transaction based on a creator identifier stored in the record that identifies the transaction that created the record.

39 Claims, 19 Drawing Sheets

| 1 110-1-1 | 1234 110-1-2 | 0 110-1-3 | SMITH 110-1-4 | LISA 110-1-5 | 100 110-1-5 |
|---|---|---|---|---|---|
| 2 110-2-1 | 1234 110-2-2 | 0 110-2-3 | LEROQ 110-2-4 | HENRI 110-2-5 | 40 110-2-6 |
| 3 110-3-1 | 1234 110-3-2 | 0 110-3-3 | REDDI 110-3-4 | MADHU 110-3-5 | 85 110-3-6 |

FIG. 7

| 1 | 1234 | 0 | SMITH | LISA | 100 |
| 110-1-1 | 110-1-2 | 110-1-3 | 110-1-4 | 110-1-5 | 110-1-5 |
| 2 | 1234 | 5000 | LEROQ | HENRI | 40 |
| 110-2-1 | 110-2-2 | 110-2-3 | 110-2-4 | 110-2-5 | 110-2-6 |
| 3 | 1234 | 6000 | REDDI | MADHU | 85 |
| 110-3-1 | 110-3-2 | 110-3-3 | 110-3-4 | 110-3-5 | 110-3-6 |
| 4 | 4000 | 0 | KASILOVA | VIKA | 95 |
| 110-4-1 | 110-4-2 | 110-4-3 | 110-4-4 | 110-4-5 | 110-4-6 |
| 2 | 5000 | 0 | LEROQ | HENRI | 75 |
| 110-5-1 | 110-5-2 | 110-5-3 | 110-5-4 | 110-5-5 | 110-5-6 |

FIG. 10

CONTROLLING VISIBILITY IN MULTI-VERSION DATABASE SYSTEMS

RELATED APPLICATIONS

This application claims the benefit of U.S. Provisional Application No. 60/410,727, filed on Sep. 13, 2002. The entire teachings of the above application are incorporated herein by reference.

BACKGROUND OF THE INVENTION

It is an object of a database system to allow many users to use the same information at the same time, while making it seem that each user has exclusive access to all information. The database system should provide this service with minimal loss of performance (latency) and maximal transaction throughput. The service is generally provided by so-called concurrency control mechanisms which are responsible for coordinating conflicting access to shared resources, ensuring serial ordering and preventing deadlocks and reducing communication and other overhead required to achieve these ends. Concurrency control is complicated by the fact that the information content of a database typically evolves over time. New information may be inserted into the database and existing information may be updated, and information may eventually deleted. Single-version databases record only the latest, most recent state of the information. If information is inserted into a single-version database at one time, and is subsequently modified, the single-version database will record only the modified state of the information. Once information is deleted from a single-version database, the deleted information is no longer accessible.

While the content of single-version databases may be modified, Single-Version Database Management Systems (DBMS) prevent modifications from being observed outside of the scope of the transaction that made the changes. This ensures that at any given time, concurrent users of single-version databases will always "see" the same information in the same state. To control concurrent access to information in this manner, modifications must be delayed until no other user or application is looking at the information to be changed.

Access to information that is in the process of being modified is typically delayed through the use of "locking" mechanisms. Acquiring a lock gives the transaction permission to use a resource in a given way, for a given period of time. If a transaction cannot acquire a lock, it must wait, or give up. In general, two transactions can both acquire read locks on a given record, but cannot both acquire write locks on the same record.

Like single-version databases, multi-version databases also record the latest, most recent state of their information. In addition, they may record other states of their information content. These other states may include previous historical versions, possible future versions, or alternative current versions of the same information. If information is inserted into a multi-version database at one time, and is subsequently modified, the multi-version database may record both the original and the modified version of the information. Even if information is deleted from a multi-version database, previous historical versions of the information may still be present and accessible.

At any given time, concurrent users of multi-version databases may therefore "see" different versions of the same information. When a user modifies the content of a multi-version database, the multi-version DBMS creates a new version of the content while preserving the original content. When other users concurrently request access to the content, the multi-version DBMS is then able to present them with the original, unmodified version. Where a single-version DBMS controls concurrency by delaying conflicting access, a multi-version DBMS controls concurrency by controlling "visibility", making different versions visible to different users at different times.

Thus, in the multi-version DBMS, fewer delays are required for controlling concurrency, less time and memory is required for "locking", and users can even access potential states, asking questions "as of" a certain time. Also, multi-level security schemes are easier to build on top of databases, and mistaken changes are more easily identified and rectified.

However, a multi-version DBMS requires significantly more persistent storage capacity (e.g. disk storage capacity), and presents challenges in efficiently selecting the appropriate version for a given request.

SUMMARY OF THE INVENTION

The present invention relates generally to a system for processing database queries, and more particularly to transaction processing in Multi-Version (MV) Data Base Management Systems (DBMS). The present invention specifically concerns a method for efficiently controlling the visibility of data and the isolation of transactions such as in a multi-version database management system.

In one exemplary embodiment, a transaction first requests a record. The transaction has an associated transaction identifier that uniquely identifies the transaction; an invisibility list that identifies other transactions whose effects are to be invisible to the transaction; and an isolation level that describes whether and when changes made by other transactions are to be visible to the transaction. A transaction manager then determines whether the record is visible to a requesting transaction based on the transaction identifier, the isolation level and the invisibility list of the requesting transaction, as well as a creator transaction identifier in the requested record that identifies the transaction that originally created the record.

The present invention provides numerous benefits and advantages over prior art systems for controlling the visibility of data. By providing an invisibility list, the present invention improves the availability of the system during recovery by allowing new user queries and transactions to proceed concurrently with recovery. The present invention improves the ability to efficiently support "as-of" queries and also eliminates the need to introduce delays and aborts for resolving read-write conflicts.

Another important advantage of the invention is that it supports the safest transaction isolation level of the SQL92 standard but is no more computationally intensive than the riskiest isolation levels.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a depiction of a very simple but illustrative table consisting of three records;

FIG. 10 is a depiction of the table in FIG. 7, after three modifications have occurred: (a) creation of a new record as described in conjunction with FIG. 9, (b) modification of an existing record, (c) deletion of an existing record;

DETAILED DESCRIPTION OF A PREFERRED EMBODIMENT

A description of preferred embodiments of the invention follows.

Figure 1:
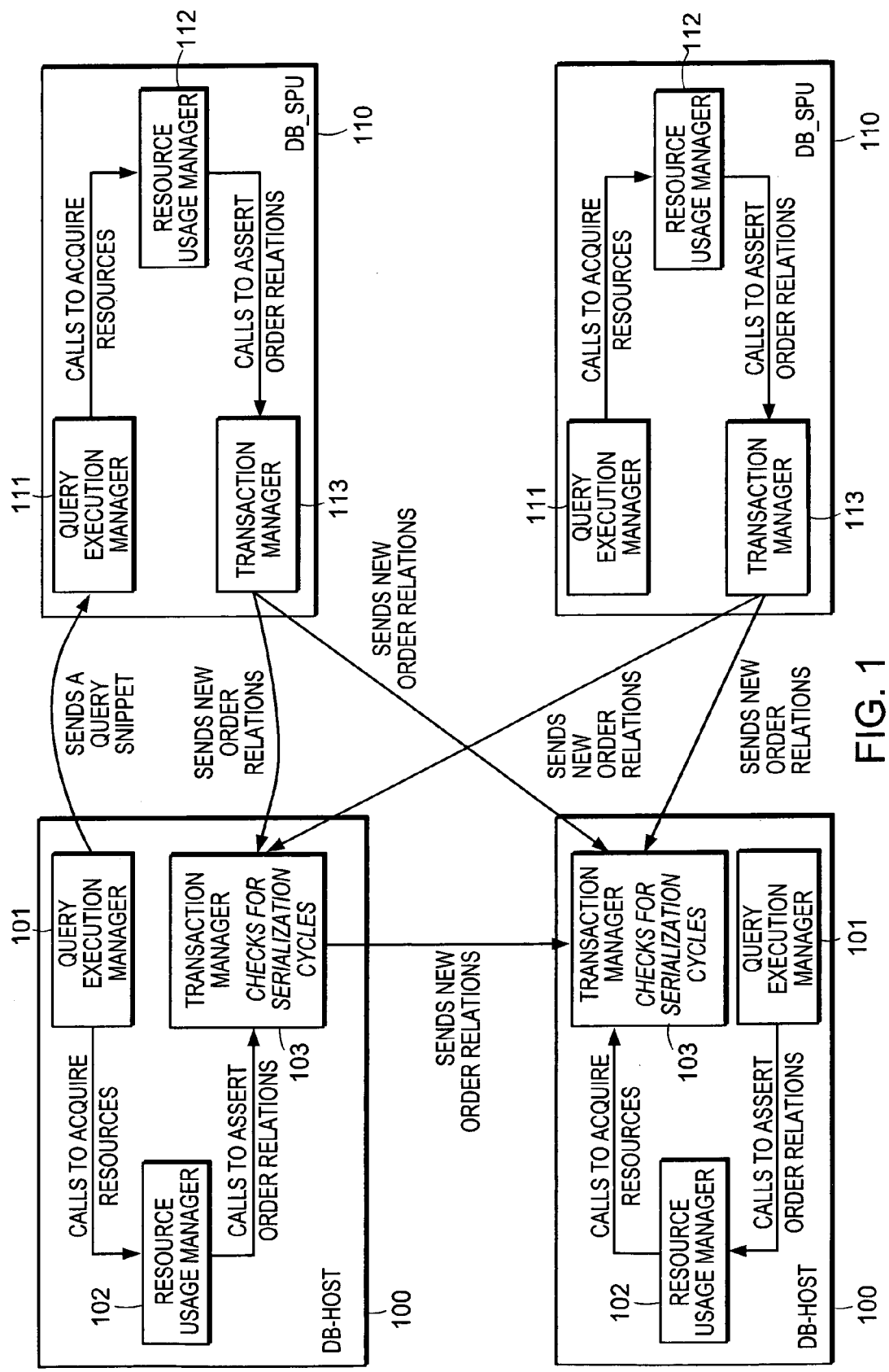
FIG. 1 is a block diagram of a distributed database system configured according to an embodiment of the present invention.

FIG. 1 is a block diagram of a distributed database system configured according to an embodiment of the present invention. A distributed database consists of many nodes, each of which may have different capabilities. A Data Base Host (DB-Host) 100 node is capable of originating new transactions. These transactions can execute queries, which may acquire resources that reside locally to the DB-Host 100 or remotely on another node. The DB-Host 100 comprises three software components, a Query Execution Manager 101, a Transaction Manager 103, and a Resource Usage Manager 102.

The Query Execution Manager (QEMgr) 101 is capable of dividing a query into snippets, some of which may be executed local to the DB-Host 100, and some of which may be executed on other nodes. A snippet is a piece of a query, which itself may contain one or more database operations.

The Resource Usage Manager (RUMgr) 102 is responsible for coordinating concurrent use of resources local to the DB-Host 100.

The Transaction Manager (TxMgr) 103 is responsible for transaction management functions, including starting, committing, aborting, and recovering transactions. In addition, the TxMgr 103 is responsible for establishing a linear serialization order for all transactions (whether originating locally or remotely to the DB-Host 100) that interact with those originating on the DB-Host 100.

A database snippet processing unit (DB-SPU) 110 node is capable of executing query snippets received from DB-Host 100 nodes. The DB-SPU 110 node need not be capable of originating new transactions. The DB-SPU 110 node comprises three software components. A Query Execution Manager (SpuQEMgr) component 111 is capable of receiving and processing a query snippet received from another node. The SpuQEMgr 111 may need to use local resources to process a query snippet, and coordinates the use of such resource by interacting with a Resource Usage Manager (SpuRUMgr) component 112. The SpuRUMgr 112 keeps track of which transactions use which resources in which ways. When two transactions use the same resource, their use may impose a serial ordering on their execution. If so, the SpuRUMgr 112 communicates this ordering to a Transaction Manager (SpuTxMgr) component 113. The SpuTxMgr 113 is responsible for maintaining a local view of the serial ordering relationship among transactions operating on the DB-SPU 110 node. If the SpuRUMgr 112 informs the SpuTxMgr 113 of a new serial ordering relationship between two transactions, and if one or both of those transactions originate on different nodes, then the SpuTxMgr 113 sends a message to the TxMgr 113 component on the nodes on which the newly ordered transactions originated.

Figure 2:
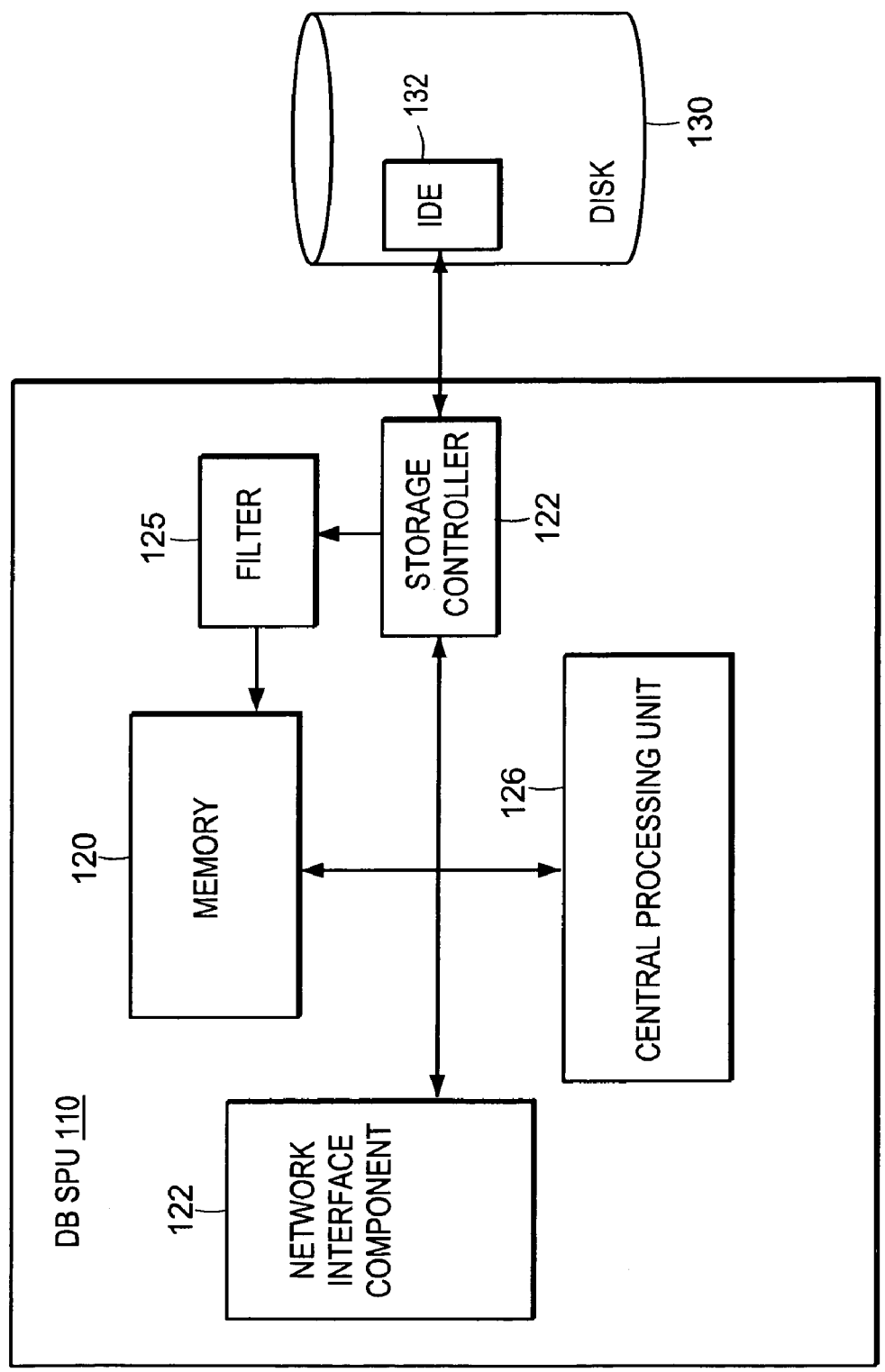
FIG. 2 is a more detailed block diagram of one of the DB-SPU nodes shown in FIG. 1.

FIG. 2 is a more detailed block diagram of one of the DB-SPU 110 nodes shown in FIG. 1. The DB-SPU 110 includes a memory 120, a central processing unit 126, a network interface component 122 for coupling to a data communication network, and a storage controller interface 124 (e.g., an IDE controller interface) for coupling to a storage controller (e.g., IDE disk drive controller) that controls a persistent storage device, for example, a disk 130. The distributed database is stored on one or more disks. Portions of the database can be copied from the disk 130 and stored in the memory 120. The database stores records in tables. Each record stored on the disk has an associated logical address used to locate the record on the disk 130 in order to copy the record into memory 120.

In a preferred embodiment, the DB-SPU 110 also includes a storage controller 122 and filter 125. As will be understood shortly, the filter 125 and the storage controller 122 can be used to speed up database analysis so that the CPU 126 is freed to perform other tasks.

More particularly, the storage controller is meant to interface to standard storage device electronic interfaces, such as an integrated device electronics (IDE) controller 132 associated with and integral to the disk 130. The filter 125 is a programmable processor or other integrated logic circuit that functions as a coprocessor or hardware accelerator for the storage controller 122 and central processing unit 126. It is used to filter data as it is read from the disk drive 130. The filter 125 is, in general, programmed to understand the database format of data retrieved from the disk and can identify block, record, and field boundaries. Data from specified fields can thus be transformed and compared with data from other fields or with constants. The comparison results can be combined to determine if a record is wanted (this is referred to as a restricted scan of the database). If so, data from fields to be returned (referred to as selected or projected fields) are returned to the memory 120. If the comparison results indicate that a record is not wanted, the filter 125 will simply cause that record to be ignored, by failing to forward it along to the memory 120 and/or central processing unit 126 for further processing.

As will be described in detail below, the filter 125 can be configured, for example, to determine if a record is valid. This is accomplished by the filter 125 examining record header information, such as creator and deleter Transaction Identifiers (TIDs). These TIDs can be used by the filter 125 to determine if a record is "current enough" to be a valid record, and therefore that it should passed along to the memory 120 and central processing unit 126 for further processing.

This visibility feature is of particular use in a situation where a database is not static. Indeed, it is common for multi-user databases to be used in such a manner that some users are analyzing a database while others are updating it. To allow concurrent access to such a database in a multi user environment, records are tagged with Transaction Identifiers (TIDs) that indicate by whom a record was created or marked obsolete. This data is then used in a situation where, for example, a user querying a database may not wish to see records created by another user whose activity has begun subsequently, or whose activity began previously but is not yet complete. Or a user, may, for example wish to only see the results of transactions entered by certain other users, or only the results of transactions not entered by certain users.

As already mentioned, the storage controller 124 is typically an industry standard compatible controller such as one which is capable of interfacing to the Integrated Device Electronics (IDE) used for disk 130. The filter 125, on the other hand, is preferably implemented as a separate Field Programmable Gate Array (FPGA) integrated circuit. It should be understood, however, that the filter can be implemented as an Application Specific Integrated Circuit (ASIC), a fully custom Application Specific Standard Product (ASSP), discrete logic in a printed circuit board, an integrated processor such as a programmable CPU that includes peripheral interface logic, or could be implemented as a separate chip or a single package, or as part of the disk drive's IDE circuitry 132.

The storage controller 124 performs basic disk I/O functions allowing read and writing of data from the disk, setting up long data transfers between contiguous regions on the disk 130 and contiguous regions within the memory 120, etc. The filter 125 is located in-line with the storage controller 124 to process records as they stream off the disk 130.

The host compiles instructions to be executed by the filter 125 that vary, depending upon the format of the records in the database. Before commencing to actually cause a transfer of data from sectors on the disk 130 to the memory 120, software running on the CPU 126 can program the filter unit 125 with the particulars of the format of the records, including other information that depends upon the query begin evaluated, such as the fields to project and/or records to restrict. The filter unit 125 can then locate record and field boundaries, employing the appropriate logical or arithmetic methods, to perform for example the visibility processing described herein below.

Figure 3:
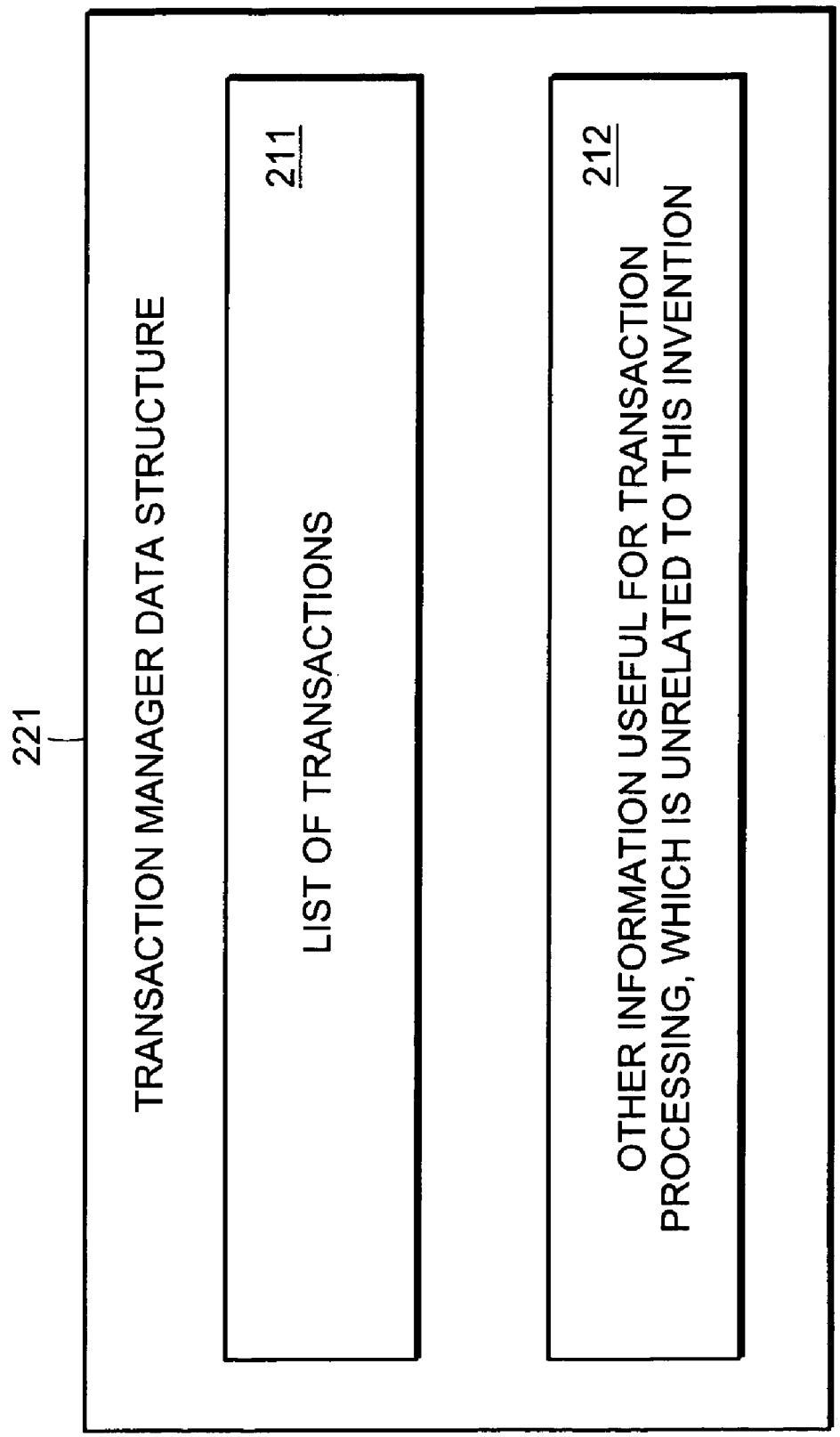
FIG. 3 is a block diagram of a Transaction manager data structure used by the Transaction Manager shown in FIG. 1.

FIG. 3 is a block diagram of a Transaction Manager (TxMgr) data structure 221 used by the TxMgr 103 shown in FIG. 1. The TxMgr data structure 221 contains a list 211 of transaction data structures, contiguous in memory. The transaction data structure will be described later in conjunction with FIG. 5. Individual transactions can be referenced by their index within this list 211. The TxMgr data structure 221 contains other information 212 useful for transaction processing. This information includes the current number of transactions in the list 211, the size of the list 211, the index of the oldest transaction in the list 211 and the index of the newest transaction in the list 211.

Figure 4:
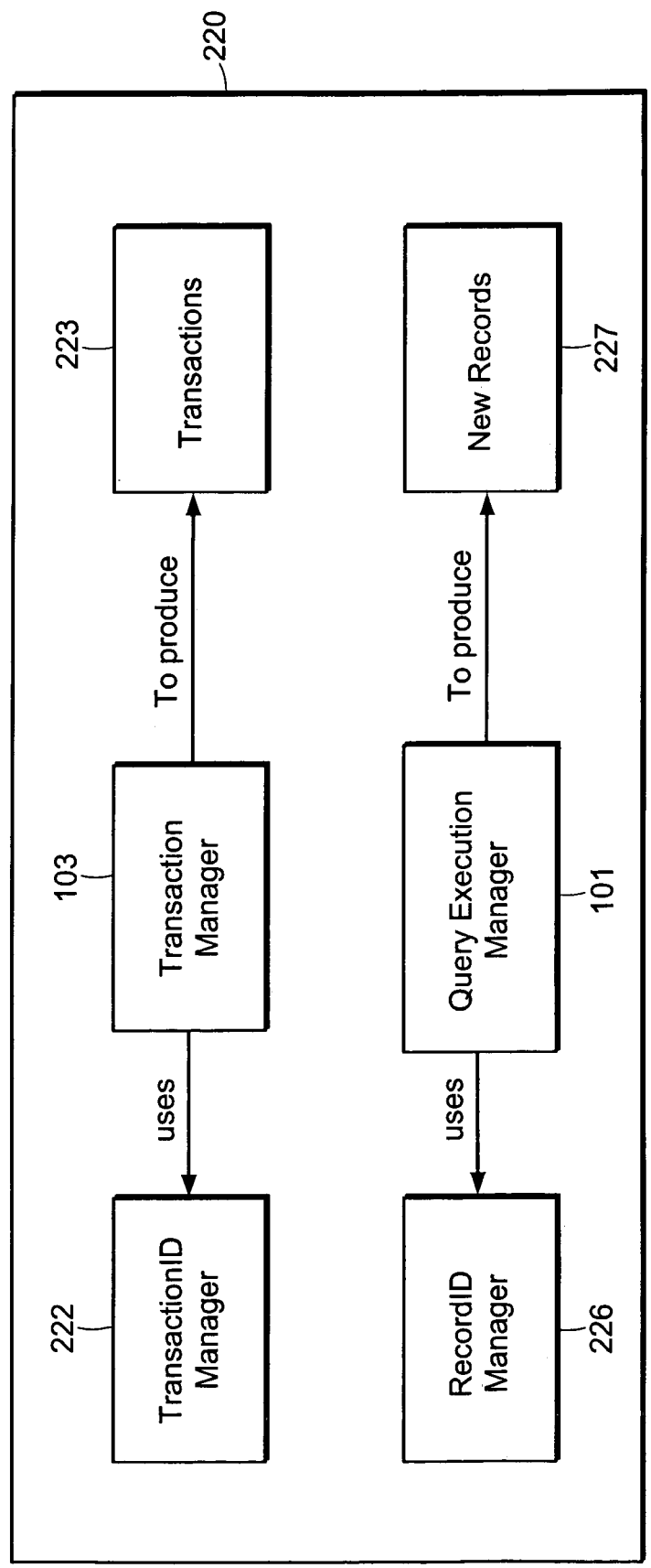
FIG. 4 is a block diagram of software components that are used by the database system.

FIG. 4 is a block diagram of software components 220 that are used by the distributed database system. The Transaction Manager (TxMgr) component 103 uses a TransactionID (TID) Manager (TxIDMgr) component 222 to produce representations of database Transactions 223.

All database transactions are uniquely identified by some symbol or quantity, referred to as a TID (Transaction Identifier). In the current implementation, TIDs are implemented as 48-bit numeric quantities. Alternatively, TIDs could be implemented as quantities of any size or type. TIDs are allocated and managed by the TxIDMgr 222. TIDs are assigned to transactions by the TxMgr 103, as the transactions 223 are created. An identity test operation is used to determine if two TIDs denote the same operation. In one embodiment, the identity test operation is an equality test.

There exists an ordering operation such that for any pair of different TIDs, one is always before (or after) the other. In the current implementation, the ordering operation is the greater than (">") or the less than ("<") numeric comparison. There are at least two reserved TIDs that will never be used to identify any transactions. One of these, a NULL TID is used to represent the notion of "no transaction". Another of these, an Aborted TID is used to represent a transaction whose modifications have been rolled back. It is convenient if these two TIDs are ordered before any other TIDs. In the current implementation, the value "0" is reserved as the NULL TID; and the value "1" is reserved as the Aborted TID.

The Query Execution manager 101 uses a RecordID manager (RecordIDMgr) 226 component to produce new records 227. The Query Execution Manager 101 computes the size of the new record, requests a new RecordID from the RecordIDMgr 226 to uniquely identify the new record and stores this value in the new record's Record ID field. The Query Execution Manger 101 also stores the "TID" of the transaction that is creating the new record in a Creator Identifier field in the record. The record ID field and Creator ID field will be described later in conjunction with FIG. 6.

Figure 5:
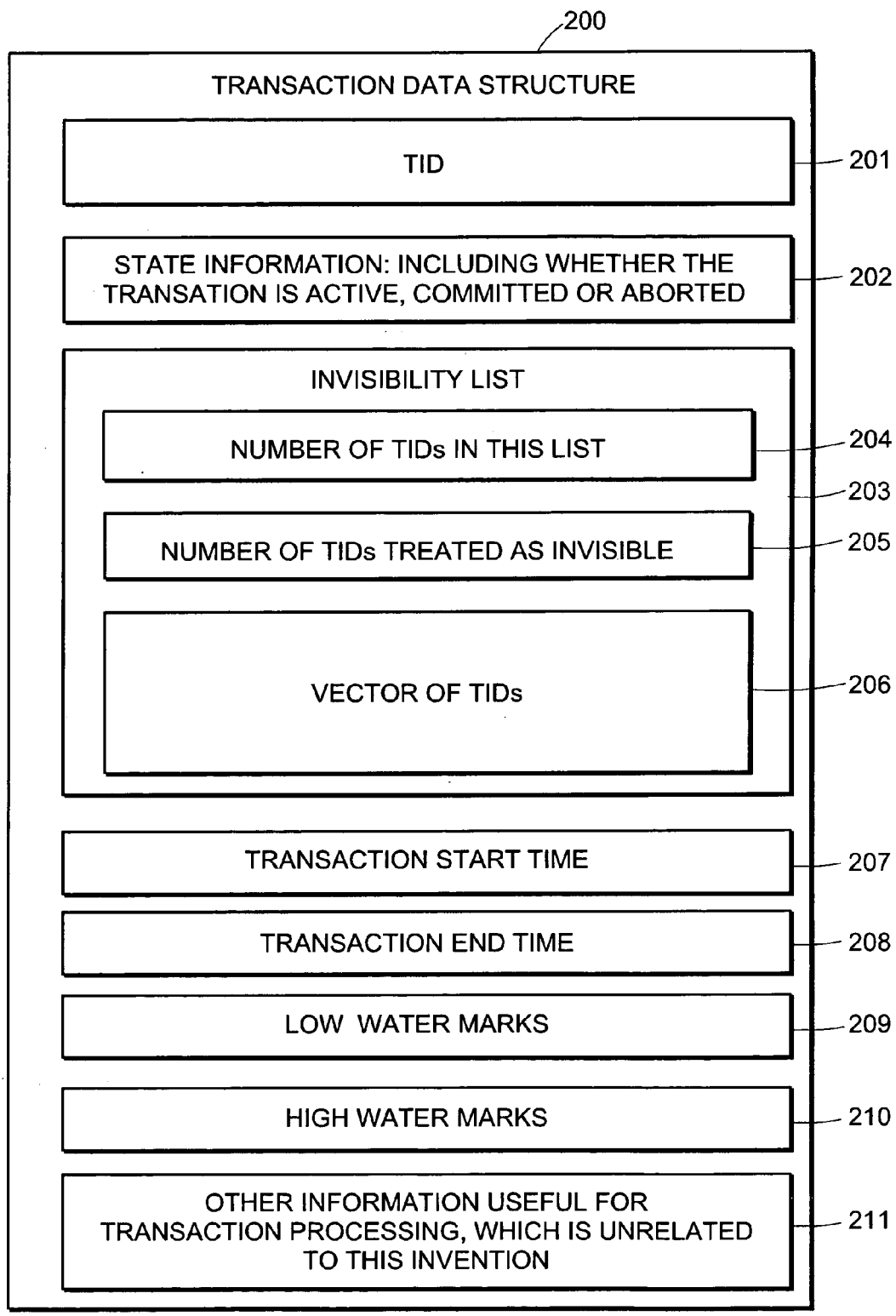
FIG. 5 is a block diagram showing the elements of a data structure used to represent a transaction.

FIG. 5 is a block diagram showing the elements of a data structure used to represent a transaction 200. A transaction 200 contains a Transaction Identifier (TID) 201, which is allocated by the TxIDMgr 222 and assigned to the transaction 200 by the TxMgr 103 when the transaction 200 is created.

A transaction 200 also contains state information 202, including an indication of whether the transaction is active, committed or aborted. When the TxMgr 103 starts a transaction 200, the state 202 of the transaction 200 is active. When the TxMgr 103 commits a transaction, the state of the transaction 202 is committed.

A transaction 200 also includes an Invisibility List (IL) 203. Invisibility List information (204, 205, 206) is used to control which version of a record is visible to a transaction at a given time. The purpose of the invisibility list 203 is to encapsulate exceptions to the basic rule of visibility—namely that a transaction 200 can by default "see" the changes produced by other transactions with TIDs that are less than or equal to its own TID, but cannot "see" that changes produced by transactions with TIDs that are greater than its own TID.

The IL 203 contains a vector of TIDs 206, along with the total number of TIDs in the vector 204, and the number of TIDs in the vector that should be treated as invisible 205. In the current implementation, the vector of TIDs 206 always contains the transaction's own TID 201, as the first TID in the vector of TIDs 206. Next, the vector of TIDs 206 contains the TIDs of other transactions that are to be invisible to the transaction 200, even though their TIDs 201 are ordered before the TID 201 of the transaction 200. Lastly, the vector of TIDs 206 contains a list of TIDs of other transactions that are to be visible to the transaction 200 (a visibility list), even though their TIDs 201 are ordered after the TID 201 of the transaction 200. In the current implementation, the vector of TIDs 206 contains no more than 32 TIDs. This is a hardware limitation in the current implementation; conceptually it is not necessary to limit the vector to 32 TIDs.

A transaction 200 also records a start time 207 and an end time 208. These times are useful for posing "as-of" queries, as well as for other transaction processing. A transaction 200 also keeps lists of low water marks 209 and high water marks 210 for each set of information that it modifies. In the current implementation, information is organized as rows within tables, so that the low water mark 209 and the high water mark 210 are kept on a per-table basis. The low water mark 209 for a given table and a given transaction is the oldest record version either created or deleted in the given table by the given transaction. The high water mark 210 for a given table and a given transaction is the most recent record version either created or deleted in the given table by the given transaction. The low water marks 209 and the high water marks 210 are used to reduce the amount of time required to perform rollback and recovery operations. Instead of scanning an entire table, these operations can start at the low water mark 209 and end at the high water mark 210.

Figure 6:
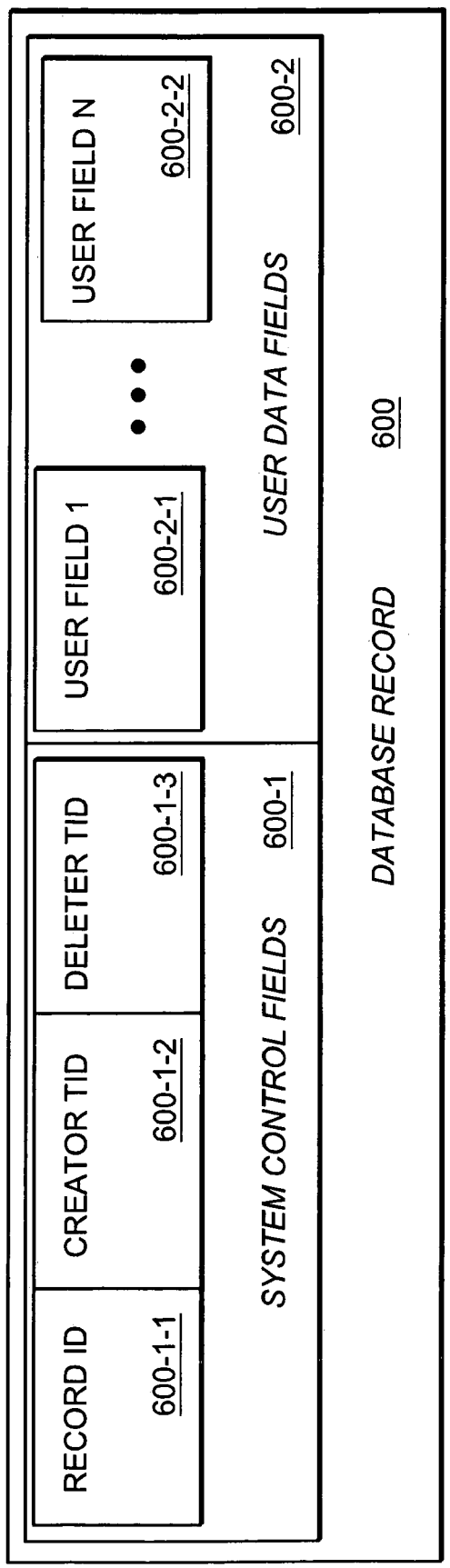
FIG. 6 is a block diagram of the layout of a record in the database.

FIG. 6 is a block diagram of the layout of a record 600 in the database. The record 600 contains fields 600-2 of interest to the users of the record 600. The record 600 also contains system control fields 600-1, which are used by the system to control visibility to the record 600. These system control fields 600-1 include a Record ID field 600-1-1, a Creator TID field 600-1-2 and a Deleter TID field 600-1-3 for storing the identifier of the transaction (TID) that deleted the record.

In a terabyte database, numeric quantities larger than 32 bits are needed to uniquely identify more than four billion rows. In the current implementation, the Record ID field 600-1-1 can store a 64-bit numeric quantity that uniquely identifies the record. In one embodiment, only 48 bits of the available 64 bits are used, resulting in faster reads. This is a compromise between speed and the number of unique transactions that can be represented. This is a reasonable compromise because a 64-bit numeric value represents far more transactions than could realistically occur. Over the lifetime of the database, two records will contain the same value in their Record ID fields 600-1-1 if and only if they are different versions of the same identical record.

In the current implementation, the Creator TID field 600-1-2 stores a 48-bit numeric quantity (CreatorTID) that uniquely identifies the transaction that created the record.

In the current implementation, the Deleter TID field 600-1-3 stores a 48-bit numeric quantity (DeleterTID) that uniquely identifies the transaction that deleted the record.

Existing multi-version database management systems associate a CreatorTID with each version. The CreatorTID stored in the Creator TID field 600-1-2 is used by the multi-version Data Base Management System (MV-DBMS) to determine "when" the version was created.

The database system differs from existing MV-DBMSs in associating a DeleterTID as well as a CreatorTID with every version. Having both a CreatorTID and a DeleterTID stored in the respective Creator TID field 600-1-2 and respective Deleter TID field 600-1-3 in every version enables the period of validity of a given version to be determined, without the need to reference other versions, thus reducing the time to determine whether a particular version should be visible. In systems without a DeleterTID, the period of validity of a given version is computed by comparing the CreatorTID stored in the Creator TID field 600-1-2 in one version with the CreatorTID in the next version. Thus, to determine which version should be visible to a user, the system must compare the CreatorTID against the user's request for two or more versions. Given a version, it must be possible to quickly locate the next version. In some systems this is accomplished by chaining successive versions together. In other systems it is accomplished by pre-allocating separate storage for successive versions.

By associating a DeleterTID with every version, there is no need to access a successive version to determine whether a prior version should be visible, to chain successive versions together or to pre-allocate persistent storage for storing different versions. Thus, the decision about whether a version should be visible can be made faster and independent of other versions of that record.

While the three system fields 600-1-1, 600-1-2, 600-1-3 are useful for the normal database operations, there are several important cases where some or all of the system fields are not required. In these cases, records can be smaller, with the advantage that more records can be read from disk per unit time; and the advantage that more disk space is available for information storage.

If information is immutable, or changes rarely, then it is not necessary to store the three system fields 600-1-1, 600-1-2, 600-1-3. An example of such information might include a table of the states in the United States or the elements of the periodic table.

In a data warehouse environment, it is common to generate "dimension" tables on a periodic basis, such as nightly, weekly or monthly. Modifications to these dimension tables are precluded outside of these periodic regenerations. Such dimension tables would not require the three system fields 600-1-1, 600-1-2, 600-1-3.

In one embodiment, the record storage on disk is divided into two parts. The larger part consists of existing records, called "old stuff". The records in the "old stuff" area are compressed, without a Creator TID field 600-1-2. The other area is called "new stuff". The records in the "new stuff" area include the three system control fields (Record TID 600-1-1, Creator TID 600-1-2 and Deleter TID 600-1-3).

FIG. 7 is a depiction of a very simple but illustrative table consisting of three records. Each record includes the three system control fields (Record ID 600-n-1, CreatorTID 600-n-2, and Deleter TID 600-n-3) described in conjunction with FIG. 6, where "n" is a row number from 1 to 3. Each record also contains three user fields 600-*n*-4, 600-*n*-5, 600-*n*-6), which represent a last-name, a first-name and a numeric value respectively.

The three records shown in FIG. 7 have been assigned sequential Record IDs. The first record has a value of "1" stored in Record ID field 110-1-1. The second record has a value of "2" stored in Record ID field 110-2-1. The third record has a value of "3" stored in Record ID field 110-3-1.

The three records have all been created by the same transaction with a TID 201 of "1234". The value "1234" is stored in the Creator TID field 110-1-2 of the first record, Creator TID field 110-2-2 of the second record and Creator TID field 110-3-2 of the third record.

The three records have not been deleted by any transaction. This is indicated by a value of "0" in the Deleter TID field 110-1-3 of the first record, Deleter TID field 110-2-3 of the second record and Deleter TID field 110-3-3 of the third record.

Figure 8:
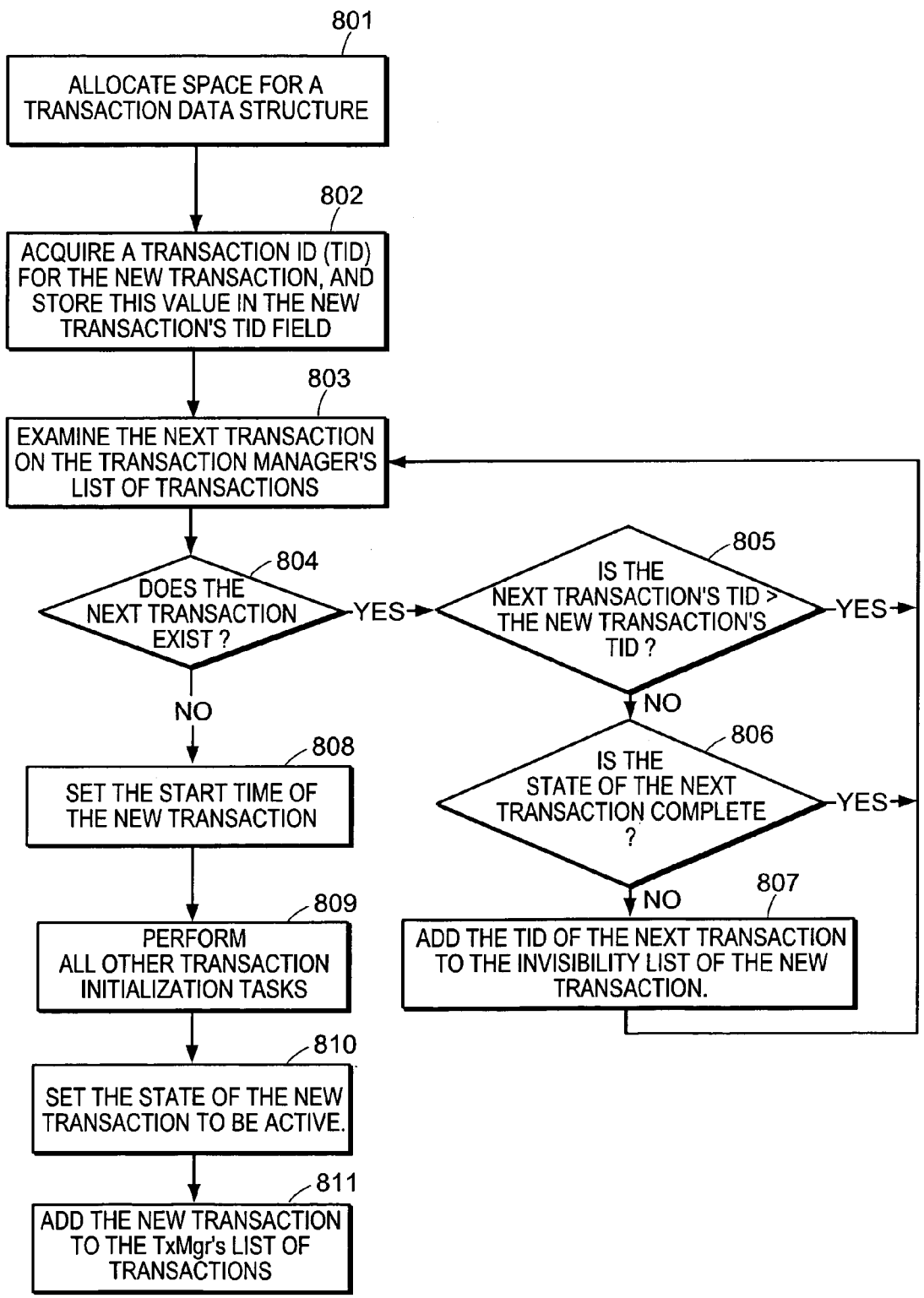
FIG. 8 is a flow chart of a procedure for creating a transaction.

FIG. 8 is a flowchart of a procedure for creating a new transaction. The procedure will now be described in conjunction with the data structures shown in FIG. 3, FIG. 5 and FIG. 6 and the software components shown in FIG. 4.

At step 801, when the TxMgr 103 (FIG. 4) starts a transaction 200, it first allocates space for a transaction data structure to represent the new transaction 200 (FIG. 5).

At step 802, the TxMgr 103 acquires a transaction identifier (TID) for the new transaction 200, by calling the TxIDMgr 222. The TxMgr 103 then stores the new TID in the TID 201 field of the transaction 200.

At step 803, the TxMgr 103 then examines the next transaction on its list of transactions 211 (FIG. 3).

At step 804, the TxMgr 103 determines for every transaction $T_j$ on this list of transactions 211 whether the transaction exits. If so, at step 805 the TxMgr 103 checks if the TID of the transaction $T_j$ is less than the TID of the new transaction. In a single-threaded embodiment of the TxMgr 103 (that is, if the TxMgr creates only one transaction at a time), then the comparison test at step 805 can be eliminated because all transactions on the list of transactions 211 are older (have a lower TID) than the TID 201 of the new transaction 200. At step 806, if the TID of the transaction $T_j$ is less than the TID of the new transaction, the TxMgr 103 checks; if the state 202 of transaction $T_j$ is active. If so, at step 807, the TxMgr 103 adds the TID 201 of the active transaction $T_j$ to the vector of TIDs 206 of the Invisibility List 203 of the newly started transaction 200.

At step 808, the TxMgr 103 then sets the transmit start time 207 of the new transaction 200 and at step 809, the TxMgr 103 performs other functions related to starting a transaction. Finally, at step 810, the state of the new transaction is set to be active in the state information field 202 (FIG. 5); and at step 811, the new transaction is added to the TxMgr 103's list of transactions 211.

Figure 9:
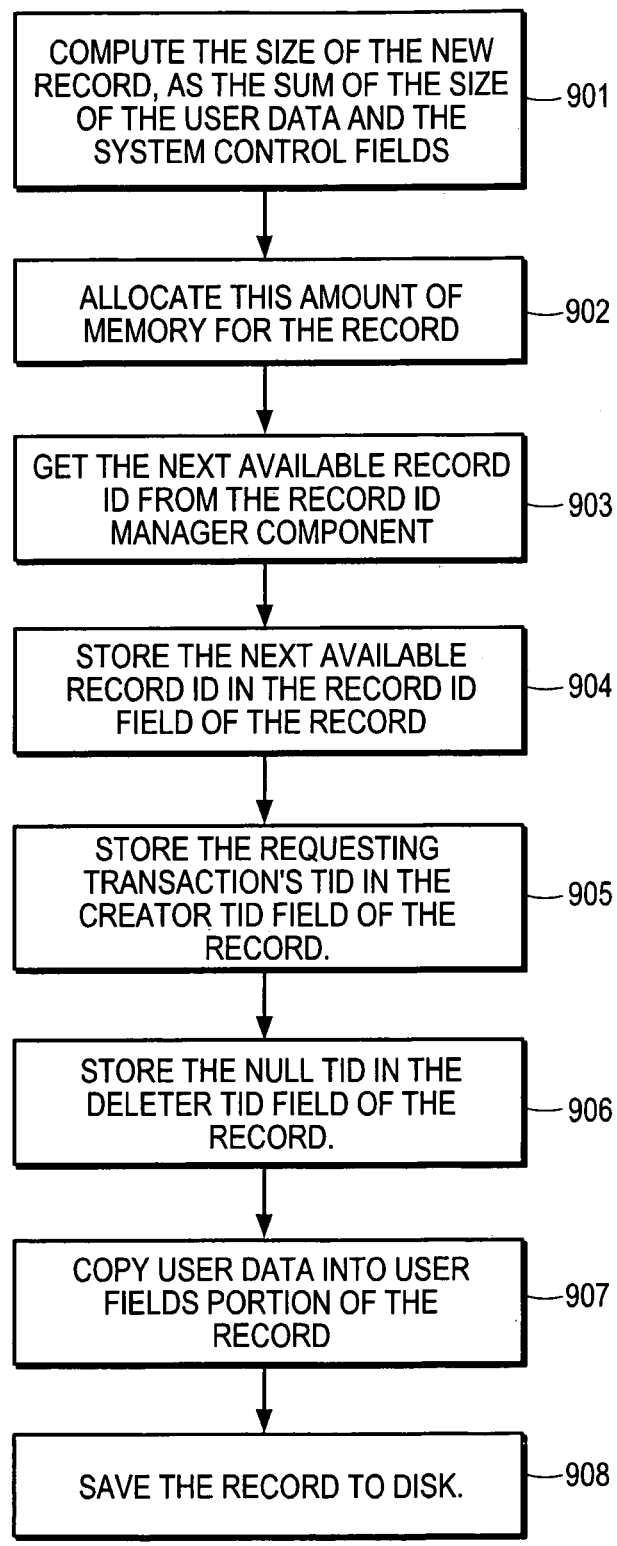
FIG. 9 is a flow chart of a preferred procedure for creating a new record.

After the transaction has been created, the transaction may create a new record. FIG. 9 is a flowchart of a preferred procedure for creating a new record.

At step 901, the Query Execution Manger 101 computes the size of the new record, by adding the amount of space required for the supplied information to the amount of space required for the system control fields 600-1 (FIG. 6) in the record. At step 902, the Query Execution Manager 101 allocates the computed memory to store the new record.

At step 903, the Query Execution Manger 101 requests a new RecordID from the RecordIDMgr 226 to uniquely identify the new record, and at step 904, the Query Execution Manger 101 stores this value in the Record ID field 600-1-1 of the new record.

Then, at step 905, the Query Execution Manager 101 stores the TID of the transaction that is creating the new record in the Creator TID field 600-1-2 of the new record. At step 906, the Query Execution Manager 101 stores the NULL TID value in the Deleter TID field 600-1-3 of the new record.

At step 907, the new record is copied into the User Fields 600-2 portion of the new record 600, and at step 908, the Query Execution Manager 101 schedules a request to save the new record to disk.

FIG. 10 is a depiction of the table in FIG. 7, after three modifications have occurred: (a) creation of a new record as described in conjunction with FIG. 9, (b) modification of an existing record described later in conjunction with FIG. 14, (c) deletion of an existing record described later in conjunction with FIG. 11.

In this example, a new record has been created at row 4 of the table. Returning to FIG. 9, at step 904, the record ID of the new record at row 4 is assigned a value of "4", and is stored in the Record ID field 110-4-1 (FIG. 10). At step 905, the CreatorTID is given the value 4000 (the TID of the hypothetical transaction creating the new record) and is stored in the CreatorTID field 110-4-2 (FIG. 10).

Returning to FIG. 10, the User Fields 600-2 portion of the new record 110-4 includes the last name "Kasilova" in the last-name field 110-4-4, the first name "Vika" in the first name field 110-4-5, and a value of 95 in the numeric value field 12-4-6.

Figure 11:
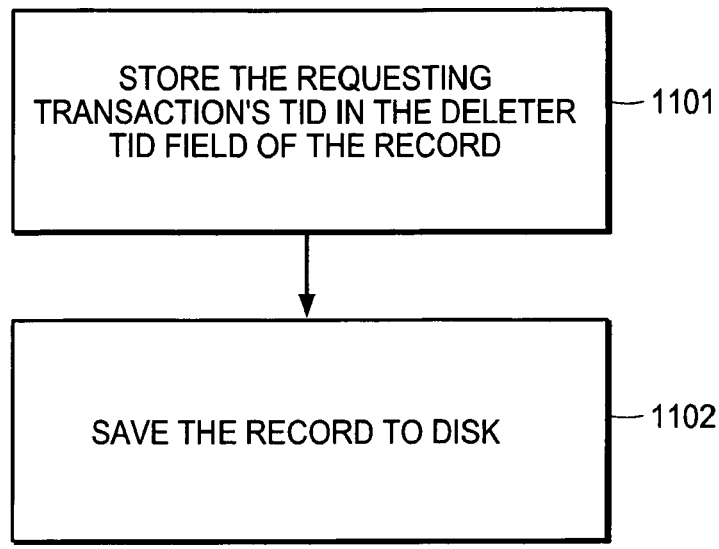
FIG. 11 is a flow chart of a procedure for deleting an existing record.

FIG. 11 is a flow chart of a procedure for deleting an existing record. A record is tagged as deleted by replacing the NULL TID stored in the Deleter TID field in the record with the TID of the transaction performing the deletion. At step 1101, the Query Execution Manager 101 stores the TID of the transaction performing the deletion in the Deleter TID 600-1-3 field of the record 600. At step 1102, the Query Execution Manager 101 schedules a request to save the modified record 600 to disk.

Returning to FIG. 10, the record 120-3 at row 3 has been deleted using the method of deletion described in conjunction with FIG. 11. The Deleter TID stored in the Deleter TID field 120-3-3 has been assigned a value 6000 (the TID of the hypothetical transaction performing the deletion of the record) and is stored in the Deleter TID field 110-3-3.

There is a variant of the method used for deleting a record that was described in conjunction with FIG. 11, called "Lazy Deletion". This method is "lazy" about deleting records, in the sense that it first only makes note of the deletions to be made, rather than immediately deleting the records. Later on, at a convenient time, the noted deletions are folded back into the system, so that the records are either physically deleted from disk, or tagged as being deleted. When the Lazy Deletion method is being used, Records 600 (FIG. 6) need not include the Deleter TID 600-1-3 field. Instead, the system writes a tuple 1200 to a separate area of the disk storing "deleted stuff".

Figure 12:
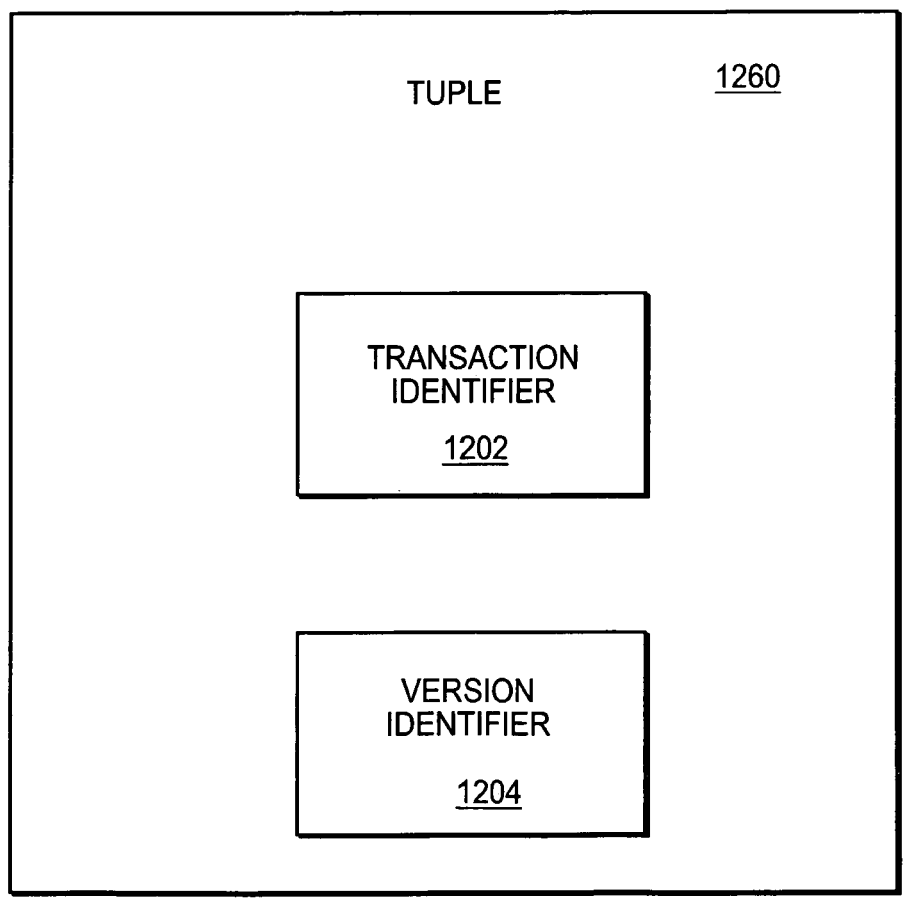
FIG. 12 is a block diagram of the layout of a tuple used for lazy deletion.

FIG. 12 is a block diagram of the layout of a tuple 1200 used for lazy deletion. The tuple 1200 describes a deletion and includes the TID of the transaction performing the deletion 1202, and an identifier of the version of the record being deleted (Version Identifier (Version ID)) 1204. In one embodiment the Version ID of a record is a logical disk address of the location of version of the record stored on a disk.

Figure 13:
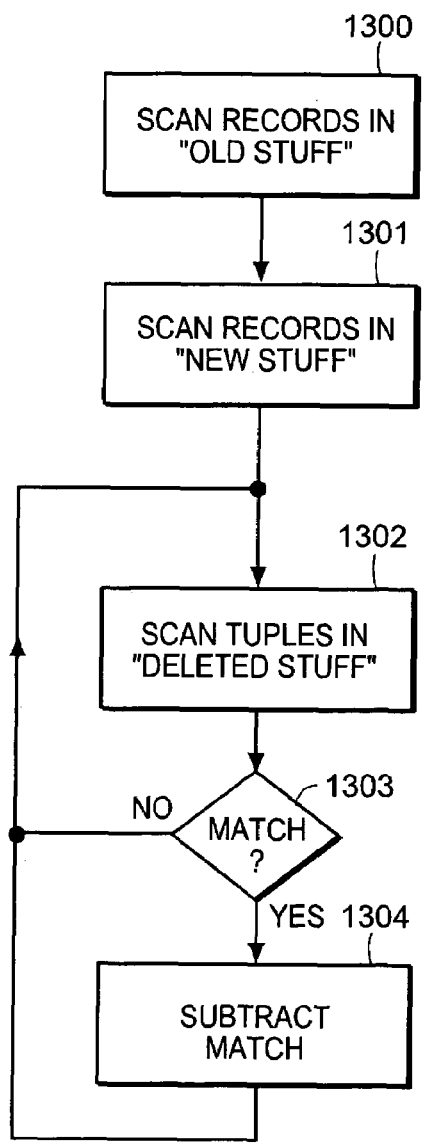
FIG. 13 is a flow chart of a procedure for modifying an existing record for retrieving records that may have been deleted using the lazy deletion procedure.

FIG. 13 is a flowchart of a procedure for retrieving records that may have been deleted using the lazy deletion procedure. At step 1300, the Query Engine Manager 101 scans the records in an "old stuff" area, using the visibility rules that will be described later, and places the results into an output stream. At step 1301, the Query Engine Manger 101 scans the records in a "new stuff" area, using the visibility rules, and adds the results to the output stream. At step 1302, the Query Engine Manager 101 scans the tuples in the "deleted stuff" area. At step 1303, the Query Engine Manger 101 checks for records in the output stream which have "matching" tuples in the "deleted stuff" area and at step 1304, the Query Engine Manager 101 subtracts the records with matching tuples from the output stream.

One rule used to evaluate a "matching" tuple at step 1303 is to proceed as follows: If (a) the tuple's Version ID field 1204 equals the Version ID of a Record in the output stream, (b) the tuple's TID 1202 is greater than or equal to the CreatorTID stored in the Creator ID field 600-1-2 of the Record in the output stream, and either (c) the tuple's TID 1202 is less than or equal to the TID of the transaction posing the query, and is not on the Invisibility List of the transaction posing the query or (d) the tuple's TID 1202 is greater than the TID of the transaction posing the query, but it is on the visibility list of the transaction posing the query then there is a match, and the record is deleted.

There are several benefits of the Lazy Deletion method. First, by avoiding the overhead of storing a Deleter TID 600-1-3 field in every record, the system can retrieve more records in a given unit of time. Second, by moving the deletion tuple 1200 out of the base record into a new area ("deleted stuff"), the system can save CPU time and a disk I/O when it performs deletions. Third, rollback processing is much more efficient, as deletion tuples 1200 can be discarded relatively quickly, in comparison with scanning the much larger "old-stuff" area for potential deletions. The theoretical cost of this method is an additional scan of the "deleted stuff" area on each query, and a join (left-not-exists-join) of the output stream and the "deleted stuff" stream. This theoretical cost can be reduced if the "deleted stuff" stream can be stored in memory instead of on disk, and if there is hardware support for joining record streams.

Periodically, the information contained in the "new stuff" area and the "deleted stuff" area is used to create a new "old stuff" area, which replaces the existing "old stuff". At that point, the new stuff area and the deleted stuff area can be flushed and reused.

Figure 14:
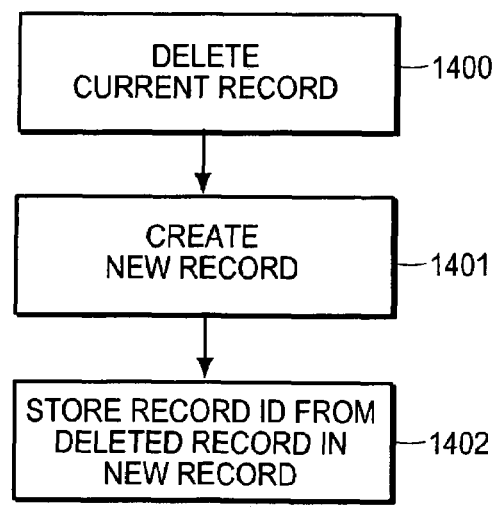
FIG. 14 is a flowchart of a procedure for modifying an exiting record.

FIG. 14 is a flow chart of a procedure for modifying an existing record. Existing information is modified by deleting the existing record, and creating a new record with the same RecordID. At step 1400, the record that encapsulates the existing information is deleted using the deletion method described in conjunction with FIG. 11 or the lazy deletion method described in conjunction with FIG. 13.

At step 1401, the Query Execution Manager 101 creates a new record, to encapsulate the modification, using the same method used for creating a new record described in conjunction with FIG. 9. At step 1403, instead of requesting a new RecordID from the RecordIDMgr 226, the Query Execution Manger 101 reuses the RecordID of the record previously deleted and stored the RecordID in the RecordID field of the new record.

Returning to FIG. 10. The record 110-2 for "Henri LeRoq" record is modified by deleting record 110-2 and creating record 110-5. For example, to change the numeric value stored in the numeric value field 110-2-6 of record 110-6 from 40 to 75, "5000" (the TID of the hypothetical transaction performing the modification) is stored in the Deleter TID field 110-2-3. Then a new version of the record is created by creating record 110-5 in the fifth row of the table shown in FIG. 10. The RecordID 110-5-1 stored in record 110-5 is '2', the same value as the RecordID stored in the RecordID field 110-2-2 in record 110-2. The Creator-TID stored in the Creator TID field 110-5-2 is 5000 (the TID of the hypothetical transaction performing the modification). Finally, note that the value associated with "Henri LeRoq" in numeric value field 110-5-6 is '75' instead '40' stored in numeric value field 110-2-6 in the old version of the record 110-2.

Figure 15:
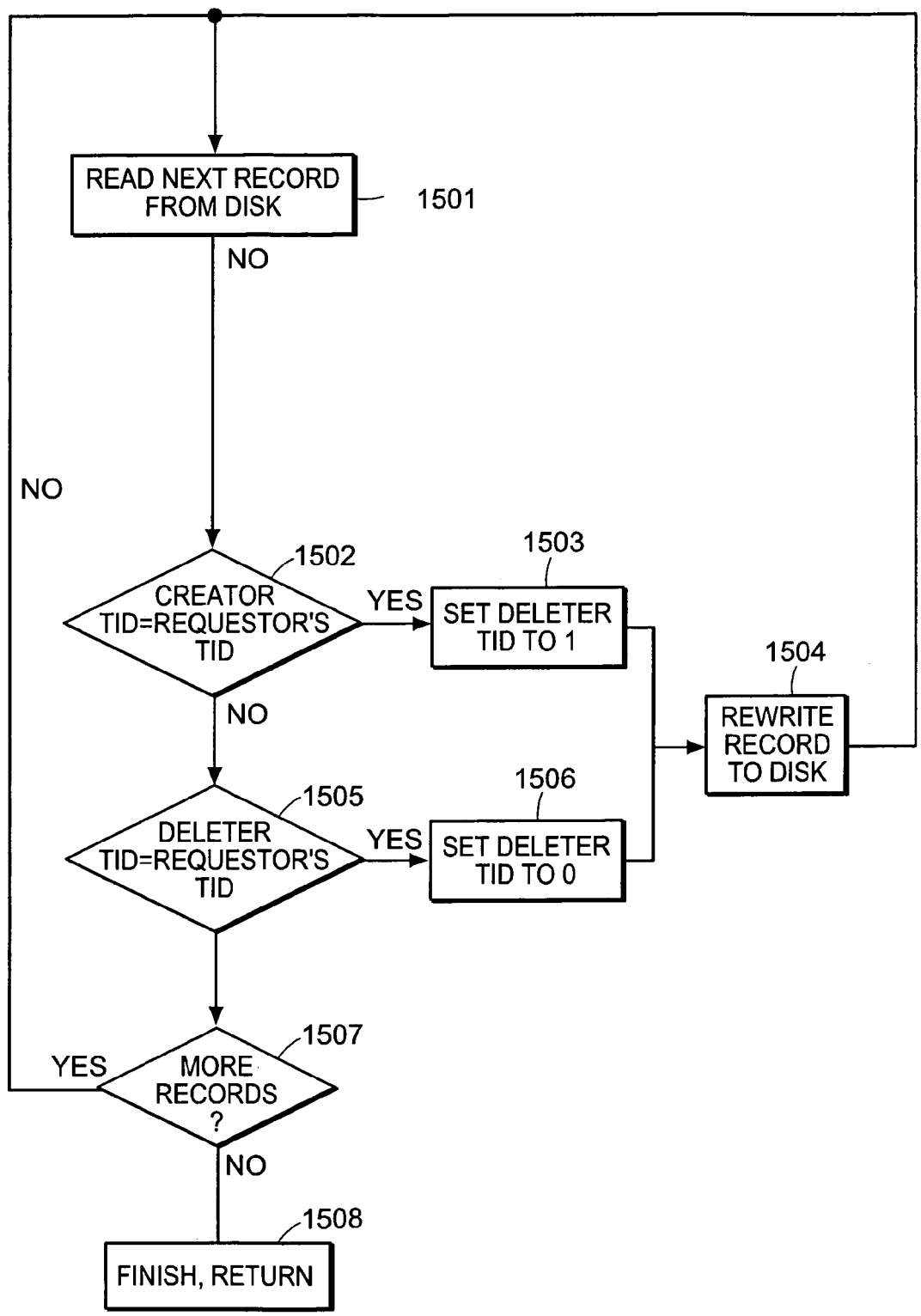
FIG. 15 is a flow chart of a procedure for rolling back the changes made during a transaction.

FIG. 15 is a flow chart of a procedure for rolling back the changes made during a transaction. At step 1501, the next record is read from the database stored on the disk. In the current implementation, the system uses the transaction's low and high water marks 209 (FIG. 5) and 210 (FIG. 5) to limit the number of records retrieved.

At step 1502, the system compares the value stored in the next record's Creator TID field 600-1-2 to the TID 201 of the transaction that is rolling back ("the aborting transaction"). If the value stored in the next record's Creator TID field 600-1-2 is the same as the TID 201 of the aborting transaction, then the record was created by the aborting transaction. In this case, at step 1503, the record's Deleter TID field 600-1-3 is set to the reserved Aborted TID value, which is "1" in the preferred embodiment. Then, at step 1504, the next record is rewritten back to the disk.

In an alternate embodiment, the deletion in step 1503 and rewrite in step 1504 is accomplished by means of the lazy deletion mechanism described above, wherein a tuple 1200 is created which includes the reserved Aborted TID along with an identifier of the next record. The tuple 1200 is then written to a "deleted stuff" area for subsequent processing. In this alternate embodiment, it is not necessary for the next record to include a Deleter TID field 600-1-3.

At the start of step 1505, it is known that the next record was not created by the aborting transaction. At step 1505, the system checks if the next record was deleted by the aborting transaction, by comparing the value of the next record's Deleter TID field 600-1-3 to the aborting transaction's TID 201. If these TIDs denote the same transaction, then the next record was deleted by the aborting transaction. In this case, at step 1506, the record's Deleter TID field 600-1-3 is set to the reserved NULL TID value, which is "0" in the preferred embodiment. This has the effect of "undoing" the deletion. Then, at step 1504, the next record is rewritten back to the disk storage device. If the value of the next record's Deleter TID field 600-1-3 does not denote the aborting transaction, then the next record was not modified by the aborting transaction, and does not need to be altered.

In an alternate embodiment, the check at step 1505 and the 'un-deletion' in step 1506 and the rewrite at step 1504 is accomplished in conjunction with the lazy deletion mechanism described above. Here the system scans the tuples in the "deleted stuff" area, looking for tuples 1200, whose transaction identifier 1202 is equal to the aborting transaction's TID 201. For each such tuple 1200, the system may either (a) remove the tuple from the "deleted stuff" area, or (b) set the transaction identifier 1202 of the tuple to an arbitrarily large value, which is greater than the maximum possible TID 201 of a transaction. Either of these approaches would have the effect of undoing the deletion.

At step 1507, the system checks to see if there are more records to be retrieved from the disk. If there are no more records, the procedure is complete, and exits at step 1508.

Database transactions have properties that distinguish them from other random groupings of database interactions. These properties are commonly referred to as ACID (Atomicity, Consistency, Isolation, Durability) properties. One of the ACID properties of a transaction is its degree of isolation from other transactions. The degree of isolation of a transaction defines the visibility of the transaction. The ANSI SQL92 standard defines four levels of transaction isolation. In order of increasing safety, these are: Read Uncommitted; Read Committed; Repeatable Read and Serializable.

Existing database management systems typically do not support all of the ANSI SQL92 transaction isolation levels. The commercial Oracle 8i DBMS, for example, offers the Read Committed isolation level as its default, and does not support the Repeatable Read or Read Uncommitted isolation levels.

The preferred embodiment supports the first three isolation levels. In addition it can support the visibility aspects of Serializable isolation (the safest isolation level) in avoiding dirty read, unrepeatable read and phantom anomalies.

The database system supports the safest isolation levels but is no more computationally intensive than the riskiest isolation levels. For environments that require both safety and speed, this can be crucial.

Figure 16:
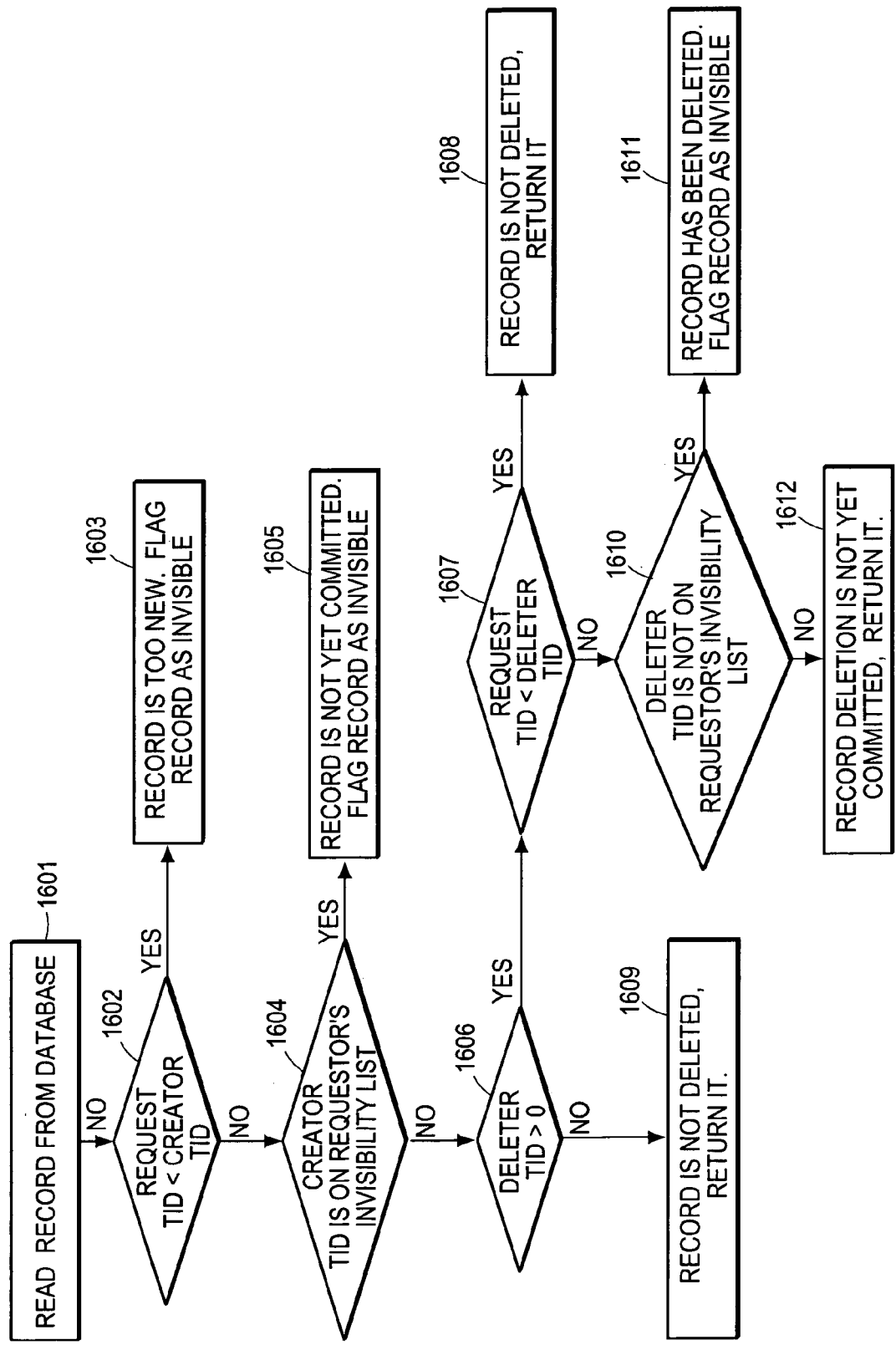
FIG. 16 is a flow chart of a procedure for controlling the visibility of records retrieved from the database in Serializable and Repeatable Read isolation modes.

To understand why, refer first to FIG. 16, which is a flowchart of a procedure for controlling the visibility of records retrieved from the database for transactions implementing the serializable and repeatable isolation levels. In conjunction with the method used for creating transactions described in conjunction with FIG. 8, this procedure is used to implement the Serializable and Repeatable Read transaction isolation levels.

The Repeatable read isolation level guarantees that a transaction will never see two different versions of the same information. If a transaction "sees" a record in a given state once, then subsequent queries continue to "see" the record in the same state, regardless of whether other transactions committed modifications to the record in the interim. The Serializable isolation level, the level with the highest safety, makes it appear that each transaction is the only transaction executing on the system. While transactions may access and manipulate information in the database concurrently in real time, the transactions behave as if they executed in serial order, with exclusive access to the database.

Referring to FIG. 16, at step 1601, a record 600 (FIG. 6) is retrieved from the database stored on a disk 130 (FIG. 2) and is stored in memory 120 (FIG. 2). At step 1602, the TID 201 (FIG. 5) of the transaction that requested the record is compared to the CreatorTID value stored in the Creator TID field 600-1-2 (FIG. 6) in the record. If the CreatorTID value is ordered after the TID value, then the record was created by a transaction that did not commit before the requestor's transaction started. The record is "too new", and is considered invisible at step 1603. In one embodiment, invisible records may be filtered out and discarded. In another embodiment, invisible records are flagged as being invisible, and are temporarily stored in memory, so that a concurrency control component of the transaction manager 103 can establish locks on the invisible record.

At the start of step 1604, the TID value stored in the Creator TID field 600-1-2 of the record is known to be ordered at the same time or before the requesting transaction's TID 201. Sometimes this will mean that the record was created by a transaction that committed before the requesting transaction started. In that case, the record should be visible to the requesting transaction. It is also possible that the record was created by a transaction that has not yet committed. These two cases are differentiated by the Invisibility List 203 (FIG. 5) of the requesting transaction. If the TID value stored in the Creator TID field 600-1-2 of the record is also stored in the requesting transaction's Invisibility List 203, then the record was created by an active transaction, one that started, but has not committed before the requesting transaction started.

At step 1604, the TID value stored in the Creator TID field 600-1-2 of the record is compared against each of the TID values stored in the requesting transaction's Invisibility List 203. If the TID value stored in the Creator TID field 600-1-2 of the record is found on the requesting transaction's Invisibility List 203, then the record is not yet committed. At step-1605, the record is flagged as being invisible.

At the start of step 1606, it is known that the record was created by a transaction that had committed before the requesting transaction started. Steps 1606, 1607 and 1610, use several different tests to determine if the record was deleted. At step 1606, the system compares the TID value stored in the Deleter TID field 600-1-3 of the record against the reserved NULL TID value. In the preferred embodiment with the NULL TID set to '0', this is equivalent to comparing the TID stored in the Deleter TID field 600-1-3 to '0'. If the TID stored in the Deleter TID field 600-1-3 of the record is equal to the reserved NULL TID value, the record has not been deleted and is returned as visible at step 1609. If the TID stored in Deleter TID field 600-1-3 of the record is not the NULL TID value, then at step 1607, the TID stored in Deleter TID field is compared to the TID 201 of the requesting transaction. If the TID stored in Deleter TID field 600-1-3 of the record is ordered after the requesting transaction's TID 201, then the deletion should not be visible to the requesting transaction, and the record is returned as visible at step 1608.

At the start of step 1610, it is known that the record was deleted by a transaction whose TID 201 is ordered at the same time or before the TID 201 of the requesting transaction. Sometimes that will mean that the record was deleted by a transaction that committed before the requesting transaction started. In that case, the record should be invisible to the requesting transaction. It is also possible that the record was deleted by a transaction that has not yet committed. These two cases are differentiated by the requesting transaction's Invisibility List 203. If the TID stored in the Deleter TID field 600-1-3 of the record is also stored in the requesting transaction's Invisibility List 203, then the record was deleted by an active transaction, one that started, but has not committed before the requesting transaction started.

At step 1610, the value of the Deleter TID field 600-1-3 of the record is compared against each of the values stored in the requesting transaction's Invisibility List 203. If the TID stored in the record's Deleter TID field 600-1-3 is found on the requesting transaction's Invisibility List 203 then the record deletion has not yet committed. The record is returned as visible at step 1612. If the TID stored in the record's Deleter TID field 600-1-3 is not found on the requesting transaction's Invisibility List 203, then the record deletion has committed. At step 1611, the record is flagged as being invisible.

Figure 17:
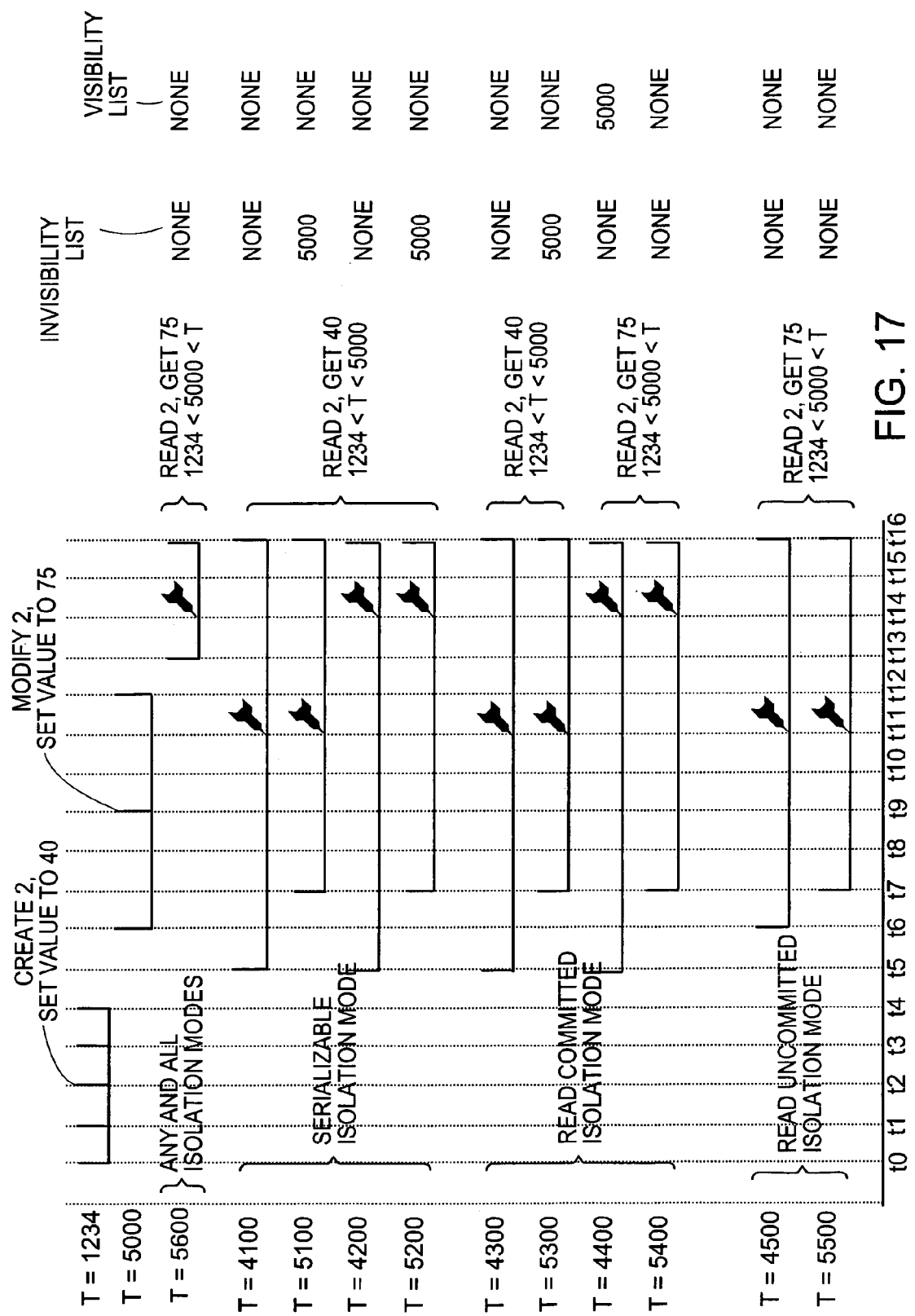
FIG. 17 is a diagram of various transaction histories over time, showing the results of visibility processing.

FIG. 17 is a diagram of various transaction histories over time, showing the results of visibility processing. FIG. 17 is described in conjunction with the tables shown in FIG. 7 and FIG. 10. A transaction with TID 1234 (Tx1234) starts at time t0. At time t2, Tx1234 creates record#2 110-2 (FIG. 7) for "Henri LeRoq", with a numeric value of 40 stored in the numeric value user field 110-2-6 using the method for creating a record described in conjunction with FIG. 9. The RecordID value stored in the RecordID field 110-2-1 associated with record#2 in row 2 of the table is '2'. At time t4, Tx1234 commits its work.

Later, a transaction with TID 5000 (Tx5000) starts at time t6. At time t9, Tx5000 modifies the record#2 110-2 (FIG.

10), changing Henri's numeric value stored in the numeric value user field 110-5-6 to 75. This results in the changes shown in FIG. 10, to field 110-2-3 and the addition of record#5 110-5 (FIG. 10) at row 5 of the table storing the modified record for Henri. At time t12, Tx5000 commits its work.

A transaction with TID 5600 (Tx5600) starts at time t13. Because Tx5600 started after Tx5000 committed, Tx5000's changes are visible to Tx5600. Therefore, when Tx5600 reads record#2 110-2 at time t14, Tx5600 "sees" the value 75 for Henri. The serialization order is that Tx1234 comes first, then Tx5000, then Tx5600.

A transaction with TID 4100 (Tx4100) starts at time t5. Because Tx4100 starts before Tx5000 commits at t2, the method prevents Tx4100 from "seeing" Tx5000's changes (i.e. record #5 110-5 (FIG. 10). Therefore, when Tx4100 reads record#2 associated with RecordID set to '2' at time t11, it "sees" the numeric value 40 stored in numeric value field 110-2-6. The serialization order is that Tx1234 comes first, then Tx4100, then Tx5000. This same logic holds for Tx4200. Even though Tx4200 reads record 110-2 (FIG. 10) after Tx5000 commits, it still "sees" the version of the record with RecordID set to '2' with the value "40" stored in the numeric value field 110-2-6 in record#2 110-2 (FIG. 10), because Tx4200's isolation mode is not Read Committed.

A transaction with TID 5100 (Tx5100) starts at time t7. Tx5100 started after Tx5000, therefore Tx5100 would normally be able to "see" Tx5000's changes. But Tx5000 had not committed when Tx5100 started. Therefore, Tx5000 is stored on Tx5100's Invisibility List. Because of this, when Tx5100 reads record#2 at time t11, Tx5000's change is invisible to Tx5100, which "sees" the value 40 stored in the numeric value field 110-2-6 (FIG. 10). The serialization order is Tx1234, then Tx5100, then Tx5000. The same logic holds for Tx5200. Even though Tx5200 reads record#2 110-2 after Tx5000 commits, it still "sees" the value of 40 stored in the numeric value field 110-2-6 (FIG. 10), because Tx4200's isolation mode is not Read Committed.

Figure 18:
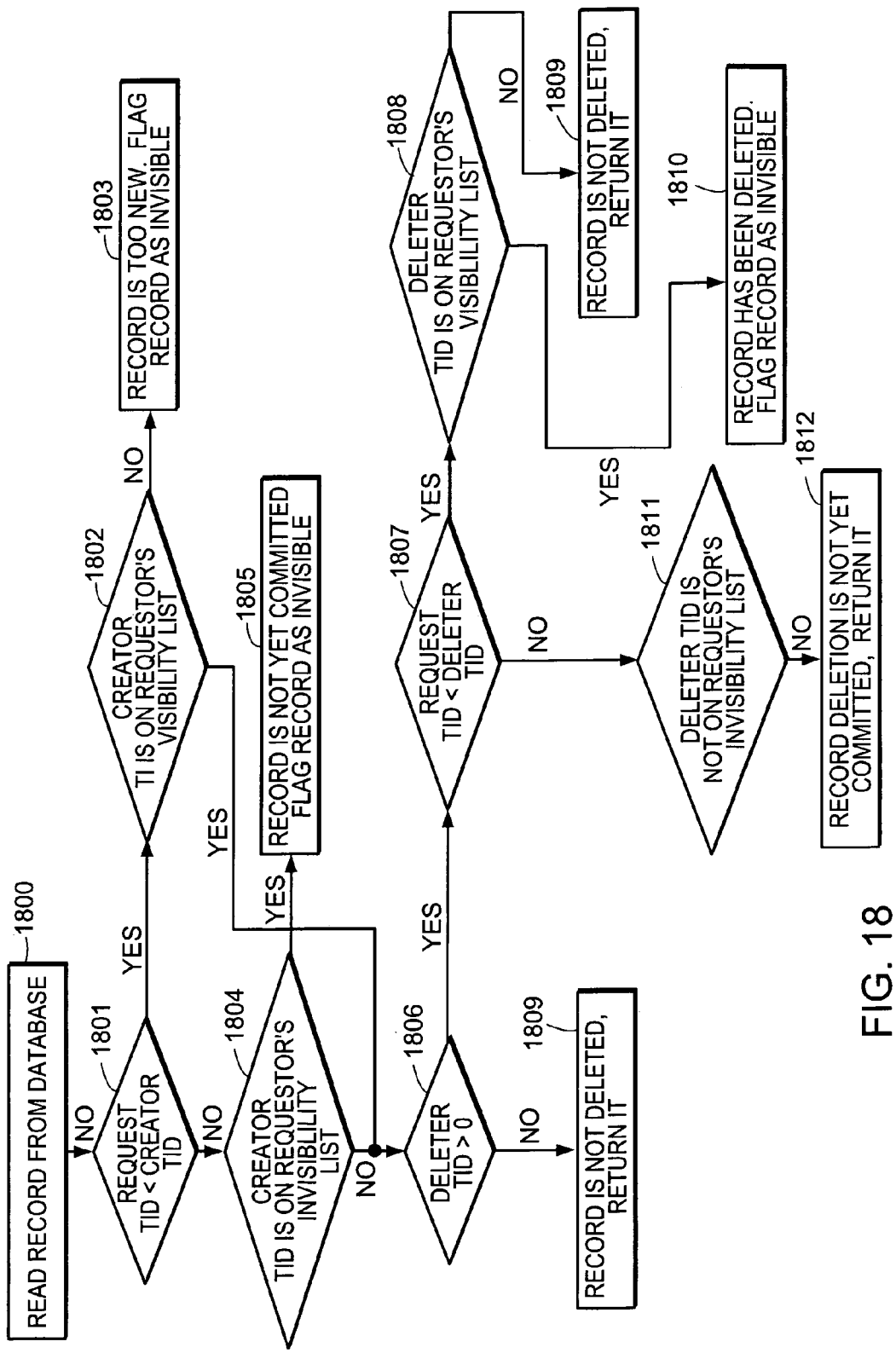
FIG. 18 is a flow chart of a procedure for controlling the visibility of records retrieved from the database in Read Committed isolation mode, similar to the procedure described in conjunction with FIG. 16, with two additional tests.

FIG. 18 is a flow chart of a procedure for controlling the visibility of records retrieved from the database for transactions operating at the Read Committed isolation level, similar to the procedure described in conjunction with FIG. 16, with two additional tests (step 1802 and step 1808).

In the Serializable isolation level, a requestor has visibility only to the information produced by transactions that committed before the requestor started. In the Read Committed isolation level, a requestor has visibility to the information produced by transactions that commit before the requestor completes. This means that if a Read Committed transaction poses the same question twice, it may receive different answers, if other transactions have committed in the interim.

As the TxMgr 103 commits transactions, it removes the committed transactions from the Invisibility Lists 203 of all Read Committed isolation mode transactions if the TID of the committed transaction is less than the TID of the Read Committed isolation mode transaction. If the TID of the committed transaction is greater than the TID of the Read Committed isolation mode transaction, the TxMgr 103 adds the TID of the committed transaction to the visibility-list portion of the Read Committed isolation mode transaction's Invisibility List 203.

Referring to FIG. 18, at step 1800, a record is retrieved from a disk 130 (FIG. 2) and is stored in memory 120 (FIG. 2). At step 1801, the TID 201 (FIG. 5) of the transaction 200 (FIG. 5) that requested the record is compared to the CreatorTID value stored in the Creator TID field 600-1-2 (FIG. 6) in the record. If the CreatorTID value is ordered after the TIED value, then the record was created by a transaction that did not commit before the requestor's transaction started.

At step 1802, a test for potential visibility of a record is performed. If the CreatorTID is stored on the Requestor transaction's visibility list (a subset of the vector of TIDs 206), the record is potentially visible, and the Deleter TID is checked starting at step 1806. If the CreatorTID is not stored in the visibility list, the record is "too new", and at step 1803 the record is considered invisible. In one embodiment, invisible records may be filtered out and discarded. In another embodiment, invisible records are flagged as being invisible, and are temporarily retained in memory, so that a concurrency control component of the transaction manager 103 can establish locks on the invisible record.

At the start of step 1804, the CreatorTID value stored in the Creator TID field 600-1-2 of the record is known to be ordered at the same time or before the requesting transaction's TID 201. Sometimes this will mean that the record was created by a transaction that committed before the requesting transaction started. In that case, the record should be visible to the requesting transaction. It is also possible that the record was created by a transaction that has not yet committed. These two cases are differentiated by the Invisibility List 203 of the requesting transaction. If the CreatorTID value stored in the Creator TID field 600-1-2 of the record is also stored in the requesting transaction's Invisibility List 203, then the record was created by an active transaction, one that started, but has not committed before the requesting transaction started.

At step 1804, the TID value stored in the Creator TID field 600-1-2 of the record is compared against each of the TID values stored on the requesting transaction's Invisibility List 203. If the TID value stored in the Creator TID field 600-1-2 of the record is found on the requesting transaction's Invisibility List 203, then the record is not yet committed. At step 1805, the record is flagged as being invisible.

At the start of step 1806, it is known that the record was created by a transaction that had committed before the requesting transaction started. Steps 1806, 1807 and 1808, use several different tests to determine if the record was deleted. At step 1806, the system compares the DeleterTID value stored in the Deleter TID field 600-1-3 of the record against the reserved NULL TID value. In the preferred embodiment with the NULL TID set to '0', this is equivalent to comparing the TID stored in the Deleter TID field 600-1-3 to 0. If the TID stored in the Deleter TID field 600-1-3 of the record is equal to the reserved NULL TID value, then the record has not been deleted. It is returned as visible at step 1609. If the TID stored in Deleter TID field 600-1-3 of the record is not the NULL TID value, then at step 1808, the TID stored in Deleter TID field is compared to the TID 201 of the requesting transaction. If the TID stored in Deleter TID field 600-1-3 of the record is ordered after the requesting transaction's TID 201, then the deletion should not be visible to the requesting transaction, and at step 1808, a test for potential visibility of the record is performed. If the TID of the requestor transaction is not stored on the requestor's visibility list, the record has been deleted, and is flagged as invisible at step 1810. If the TID of the requestor transaction is on the visibility list, the record has not been deleted and is returned at step 1809.

At the start of step 1811, it is known that the record was deleted by a transaction whose TID 201 is ordered at the same time or before the TID 201 of the requesting transaction. Sometimes that will mean that the record was deleted by a transaction that committed before the requesting transaction started. In that case, the record should be invisible to the requesting transaction. It is also possible that the record was deleted by a transaction that has not yet committed. These two cases are differentiated by the requesting transaction's Invisibility List 203. If the TID stored in the Deleter TID field 600-1-3 of the record is also stored in the requesting transaction's Invisibility List 203, then the record was deleted by an active transaction, one that started, but has not committed before the requesting transaction started.

At step 1811, the value of the Deleter TID field 600-1-3 of the record is compared against each of the values stored in the requesting transaction's Invisibility List 203. If the TID stored in the record's Deleter TID field 600-1-3 is found on the requesting transaction's Invisibility List 203 then the record deletion has not yet committed. The record is returned as visible at step 1812. If the TID stored in the record's Deleter TID field 600-1-3 is not found on the requesting transaction's Invisibility List 203, then the record deletion has committed. At step 1810, the record is not returned and is flagged as being invisible.

The Read Committed isolation level is further described in conjunction with the transaction histories illustrated in FIG. 17.

Returning to FIG. 17, a transaction with TID 1234 (Tx1234) starts at time t0. At time t2, Tx1234 creates record#2 110-2 (FIG. 10) for "Henri LeRoq", with a value of 40 stored in the numeric user field 110-2-6. At time t4, Tx1234 commits the record.

Later, a transaction with TID 5000 (Tx5000) starts at time t6. At time t9, Tx5000 modifies record#2, by marking record#2 110-2 (FIG. 10) as deleted and creating a new version of the record 110-5 with RecordID of '2' stored in the RecordID field and a numeric value of '75' stored in the numeric user field 110-2-6. This results in modifications to the table shown in FIG. 10. As shown, row 110-5 has been added and numeric field 110-5-6 now stores '75' and. At time t12, Tx5000 commits its work. Transactions 4300, 5300, 4400 FIG. 17 illustrate the effects of this method under different combinations of transaction start times and read times.

A transaction with TID 4300 (Tx4300) starts at time t5. The method prevents Tx4300 from "seeing" Tx5000's changes because Tx4300 starts before Tx5000. Therefore, when Tx4300 reads record#2 at time t11, it "sees" the numeric value 40 stored in the numeric value field 110-2-6 in record#2 110-2. The serialization order is that Tx1234 comes first, then Tx4300, then Tx5000.

A transaction with TID 5300 (Tx5300) starts at time t7. Tx5300 would normally be able to "see" Tx5000's changes because Tx5300 started after Tx5000. But Tx5000 had not committed when Tx5300 started. Thus, Tx5000 is stored on Tx5300's Invisibility List 203. Because of this, when Tx5300 reads record#2 at time t11, Tx5000's change to record#2 is invisible to Tx5100, which "sees" the value 40 for Henri. The serialization order is Tx1234, then Tx5300, then Tx5000.

A transaction with TID 4400 (Tx4400) starts at time t5. Initially Tx4400 is prevented from "seeing" Tx5000's changes because Tx4400 starts before Tx5000. At time t12, when Tx5000 commits, its changes should become visible to Tx4400, which operates in Read Committed isolation mode. Tx5000 is stored on Tx4400's visibility list. Ordinarily, Tx4400 would not be able to see Tx5000's changes, because it started before Tx5000. However, because Tx5000 is on Tx4400's visibility list, Tx5000's changes are visible to Tx4400. Therefore, when Tx4400 reads record #2 at time t14, it "sees" the value 75 stored in numeric value field 110-5-6. The serialization order is that Tx1234 comes first, then Tx5000, then Tx4400.

A transaction with TID 5400 (Tx5400) starts at time t7. Tx5400 would normally be able to "see" Tx5000's changes because Tx5400 started after Tx5000. But Tx5000 had not committed when Tx5400 started. Therefore, Tx5000 is stored on Tx5400's Invisibility List 203. At time t12, Tx5000 commits and its changes become visible to Tx5400, which operates in Read Committed isolation mode, by removing Tx5000 from Tx5400's Invisibility List 203. Therefore, at time t14, when Tx5400 reads record#2, it "sees" the value 75 for the other version of record#2 stored in numeric value field 110-5-6. The serialization order is Tx1234, then Tx5000, then Tx5400.

An important benefit of the methods described in conjunction with FIG. 17 and FIG. 18 above is that the Unrepeatable Read anomalies associated with the Read Committed isolation mode can be avoided.

The Unrepeatable Read anomaly occurs when a transaction T1 reads a data item, a different transaction T2 commits a modification to that same data item, and transaction T1 repeats its read of the data item. The value that T1 "sees" for the data item may change between the first time it was read and the subsequent time it was read, due to T2's committed modification.

Referring to FIG. 17, for example, Tx4300 reads record#2 twice: once at time t11 and then again, after Tx5000 committed, at time t14. At time t11, Tx4300 will see the original numeric value of 40 for record#2 stored in the numeric value field 112-2-6. After Tx5000 commits, its TID is added to Tx4300's visibility list, and at time t14, Tx4300 will see the new value of 75 stored in numeric value field 110-5-6 of the new version of record#2 110-5. This is an example of the Unrepeatable Read anomaly. The value of record#2 appears to have changed for Tx4300, even though Tx4300 did not make the change itself.

In the ANSI SQL 92 standard, the unrepeatable read anomaly is referenced in the definition of the Read Committed isolation level. The preferred embodiment supports this standard, with the anomaly, as has already been described. The preferred embodiment also offers transactions the ability to read the latest committed data, without the unrepeatable read anomaly. This ability is similar to the ANSI SQL 92 standard's Repeatable Read isolation level, which precludes the anomaly. Implementations of Repeatable Read, however, are not required to provide the latest committed data. The method listed in the section above on implementing Repeatable Read isolation, for example, operates by providing visibility only to transactions that have committed before the reader starts. It guarantees repeatable reads, but does not provide visibility to the latest committed data.

The preferred embodiment supports the ability to read the latest committed data while avoiding the Unrepeatable Read anomaly in several ways.

The transaction manager component (TxMgr 103) keeps track of the versions of records retrieved during the course of a transaction. These versions can be identified by a combination of the RecordID field 600-1-1 and Creator TID field 600-1-2, through a logical address representing where the record is stored on a disk, through an explicit version ID for the record, or through other mechanisms. When the visibility methods described above make a version visible, the TxMgr 103 checks to see if a different version of the same record has already been seen. If so, it can either abort the requesting transaction or re-retrieve the version previously seen. In the present embodiment, when Tx4300 reads record#2 at time t11, the TxMgr 103 notes that it had "seen" the version of record#2 produced by Tx1234. Later, at time t14, after Tx5000 commits, Tx4300 reads record#2 again. This is the version of record#2 produced by Tx5000. The TxMgr 103 determines that Tx4300 has already seen a different version of record#2. The TxMgr 103 can abort Tx4300, or choose the version previously seen.

In another embodiment, the transaction manager component keeps track of the serialization order. At time t11, Tx4300 reads record#2. The TxMgr 103 serializes Tx4300 before Tx5000 because Tx4300 read a value of 40 stored in the numeric value field 110-2-6 (FIG. 10) before Tx5000's change (i.e. while Tx5000 produced a value of 75). Later, at time t14, after Tx5000 commits, Tx4300 reads record#2 again. This time, the TxMgr 103 attempts to serialize Tx4300 after Tx5000, because Tx4300 has "seen" the result of Tx5000's change. Of course, Tx4300 cannot be both before and after Tx5000. The fact that this second attempt to read record#2 would result in a serialization cycle, enables the TxMgr 103 to either abort the transaction or to choose the original and earlier version of record#2 to avoid creating the cycle.

These embodiments are enabled by the system's use of the RecordID field 600-1-1, Creator TID field 600-1-2 and Deleter TID field 600-1-3. In addition, the fact that the method used for implementing Serializable and Repeatable Read transaction isolation returns versions flagged as invisible (at step 1803, 1805 and 1810 in FIG. 18) allows the TxMgr 103 to use versions that have become invisible, if they were previously seen—thus avoiding the anomaly. These embodiments illustrate the ability of the TxMgr 103 component to avoid unrepeatable reads while preserving the ability to read the latest committed data.

Figure 19:
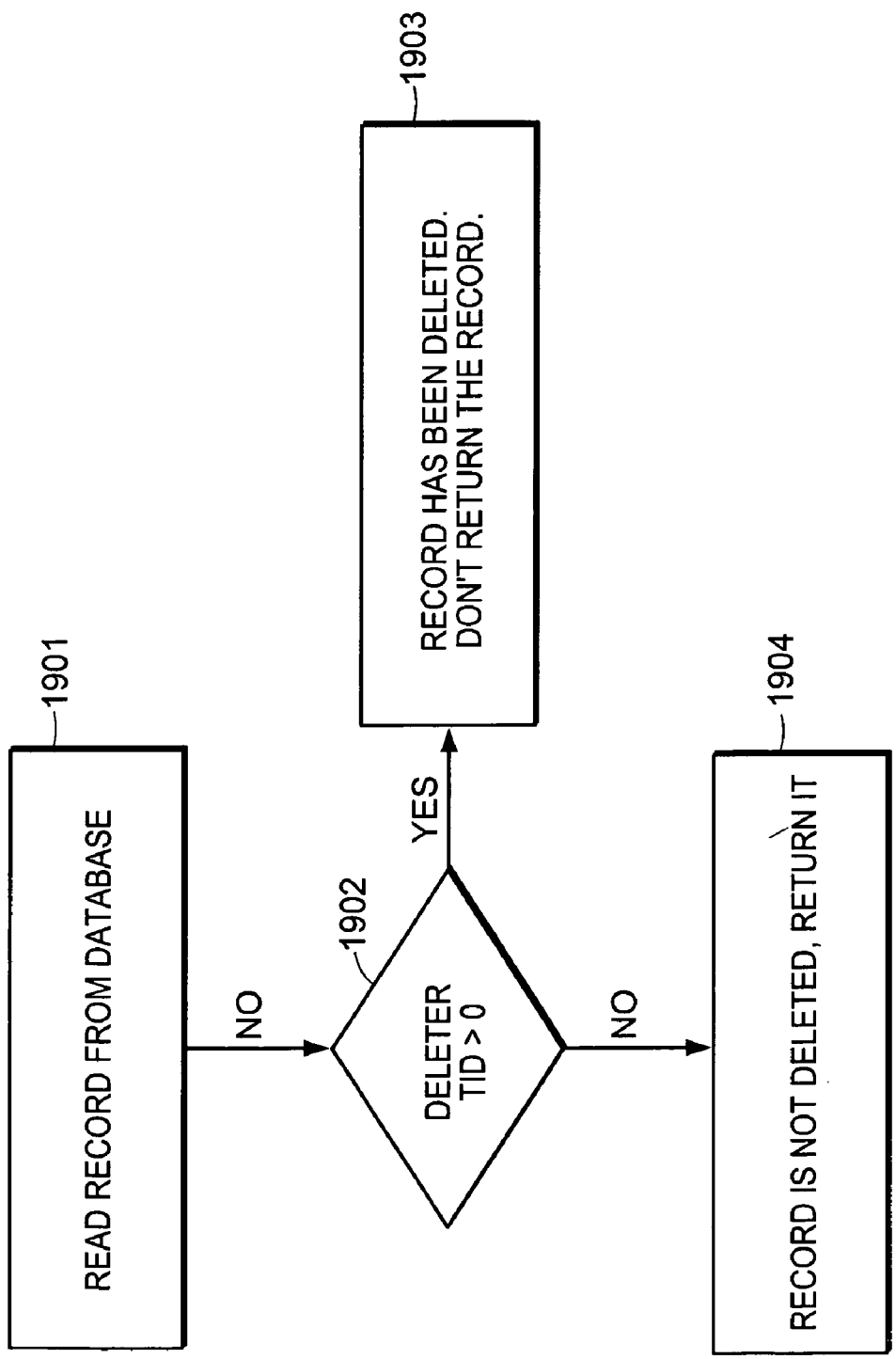
FIG. 19 is a flow chart of a procedure for controlling the visibility of records retrieved from the database in Read Uncommitted isolation mode.

FIG. 19 is a flowchart of a procedure for controlling the visibility of records retrieved from the database in the Read Uncommitted (dirty read) isolation mode. The Read Uncommitted isolation level is the isolation level with the lowest level of safety. It permits a transaction to have visibility into the changes made by other transactions before the other transactions have committed. An anomaly associated with Read Uncommitted isolation, called "dirty read", is that a transaction may "see" data that never actually existed, if that data was written by a transaction that later aborted.

The system returns the most recent version of the record, which will be the version (if any) that is not yet deleted by a TID. In contrast to the method described in conjunction with FIGS. 16 and 18, the method does not perform comparisons with the Creator TID field 600-1-2, and with the Invisibility List 203.

At step 1901, a record in the database stored on a disk is retrieved from a disk and is stored in memory in the DB-system.

At step 1902, the system compares the value in the DeleterTID field 600-1-3 of the retrieved record with the NULL TID value. In the current implementation, this is equivalent to comparing the Deleter TID field 600-1-3 value to 0. If the record's Deleter TID field 600-1-3 value is equal to the reserved NULL TID value, then the record has not been deleted.

At step 1903, if the record's Deleter TID field 600-1-3 value is not the NULL TID value, then the record has been deleted and the procedure exits without returning the record.

At step 1904, the record has not been deleted and is returned as visible.

Examples of the results of the method described in conjunction with FIG. 19 are shown in FIG. 17. Referring to FIG. 17, a transaction with TID 1234 (Tx1234) starts at time t0. At time t2, Tx1234 creates record#2 with RecordID set to '2' 110-2 (FIG. 10) to describe "Henri LeRoq", with a value of "40" stored in the numeric value field 110-2-6. At time t4, Tx1234 commits its work.

Later, at time t6, a transaction with TID 5000 (Tx5000) starts. At time t9, Tx5000 modifies record#2 by creating a new version of record#2 110-5 with the numeric value field set to "75". This results in the changes illustrated in FIG. 10, to field 110-2-3 and row 110-5. At time t12, Tx5000 commits its work.

A transaction with TID 4500 (Tx4500) starts at time t5, and reads record#2 at time t11. At this time, there are two versions of record#2. The first version of record #2 110-2 (FIG. 1) has been deleted by Tx5000. The new version of record#2, created by Tx5000 at time t9 has not been deleted (because there is a NULL TID in its Deleter ID field). Therefore, the method returns the other version of record#2 110-5 (FIG. 10), and Tx4500 "sees" the value 75 in the numeric value field 110-5-6 (FIG. 10). This is true even though Tx5000 has not yet committed its work. The serialization order is that Tx1234 comes first, then Tx5000, then Tx4500. The same logic applies to the transaction with TID 5500. Transaction start order and Invisibility/Visibility Lists are not used to process queries in Read Uncommitted isolation mode.

The information in a database changes over time. It is frequently useful for users and applications to ask historical questions. An "as-of" query is an interaction with the database that produces the same results as would have been produced if the interaction occurred at an earlier time. "As-of" queries are useful for audits, for making historical comparisons, for database repair and for other reasons.

Typically, Single Version (SV) DBMSs do not handle "as-of" queries well, because they directly record only the current state of information, and do not automatically preserve prior states. One brute force approach is to restore the prior state of the database from a backup taken "as-of" the desired time. While this enables the "as-of" query, it blocks out other users from asking question about the present state of information in the database or about other times of interest. Also, restoring a database from a backup is time and maintenance intensive.

Another approach is for users and applications to implement and maintain an independent history, without system support. However, user errors or application errors can corrupt the history and obviate its value. Also, historical corruption can occur if portions of the database are left "un-versioned"; but if all users are responsible for maintaining a version history of all changes to the database, then the SV DBMS now has multiple versions similar to an MV-DBMS.

MV-DBMSs are more suitable for "as-of" queries, because they maintain a history of change as part of their normal operation. However, there may have been several concurrent transactions interacting with the database "as of" a given time, each with slightly different visibility. Thus the "as-of" query is ambiguous between the views of the various transactions that were active "as of" the given time.

The database system improves the ability to efficiently support "as-of" queries by controlling version visibility. A transaction identifier (TID) 201 of a requesting transaction can be set to the value of a TID 201 of a transaction that started before the "as-of" time and committed after the "as-of" time. The TIDs of other transactions that started before the "as-of" time, but committed after the "as-of" time, and which are known (by reference to the system's transaction log") to have serialized after the requestor's TID, are placed on the requestor's Invisibility List 203. This ensures a view of the database "as of" the given time that is consistent with the actual serialization assigned to transactions active at the given time.

Two methods of creating such a transaction are provided, one for Read Committed isolation and one for Serializable isolation. With Read Committed isolation, it is sufficient for the given transaction to see all transactions that had committed (and only such transactions) as of the specified time. The method used for creating such a transaction is described in conjunction with FIG. 20.

Figure 20:
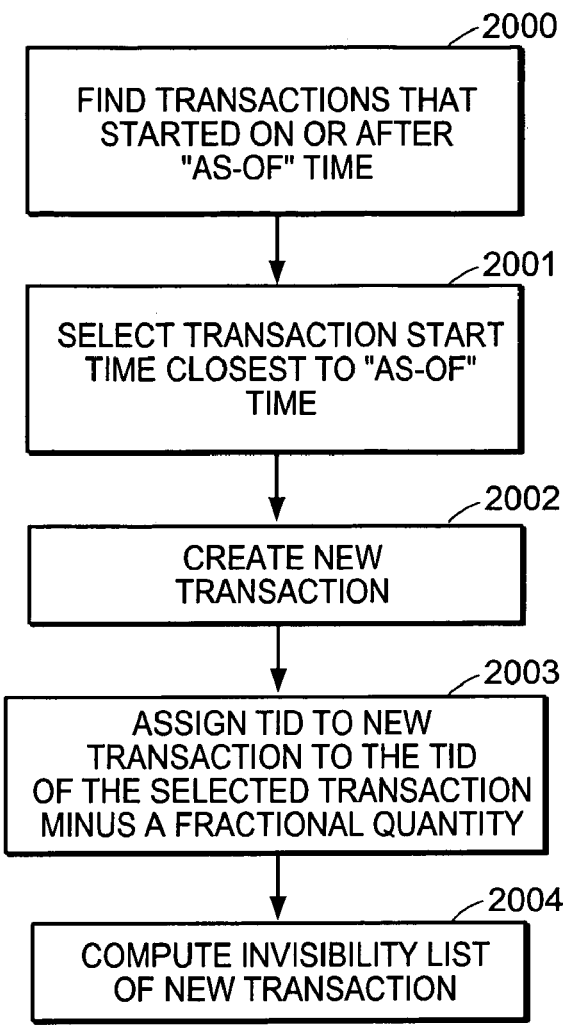
FIG. 20 is a flow chart of a procedure for performing an "as-of" query with read committed isolation.

FIG. 20 is a flow chart of a procedure for performing an "as-of" query with read committed isolation. At step 2000, the TxMgr 103 consults a transaction journal (TxJournal), to find transactions that started on or after the specified "as-of" time, by comparing the transactions' Transaction Start Time 207 field to the specified "as-of" time. From this subset, at step 2001, the TxMgr103 selects the transaction with a Transaction Start Time 208 that is closest to the specified "as-of" time.

At step 2002, the TxMgr 103 creates a new transaction as described in conjunction with FIG. 8. At step 2003, the new transaction is assigned a TID 201 equal to the TID 201 of the selected transaction less a fractional quantity. This ensures that there are no transactions whose TID 201 lies between the TID 201 of the new transaction and the TID 201 of the selected transaction. In one embodiment, fractional TIDs are implemented by reserving a low-order bit such that actual transactions will always have "even" TIDs (with the low-order bit not set), while transactions for "as-of" queries will always have "odd" TIDs (with the low-order bit set).

At step 2004, the Invisibility List 203 of the new transaction is computed by finding all transactions in the TxJournal having TIDs 201 that are less than the TID of the selected transaction and Transaction End Times 208 greater than the specified "as-of" time. This ensures that the new transaction sees the changes made by all transactions that committed prior to the specified time and does not see changes made by any transactions that committed after the specified time.

Figure 21:
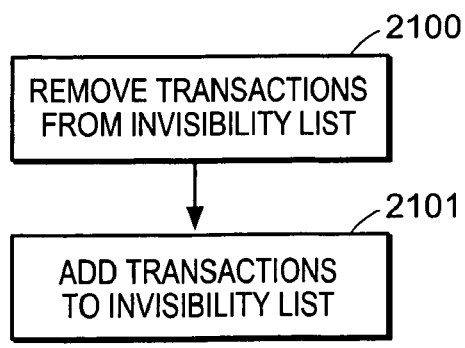
FIG. 21 is a flow chart of a procedure for performing an "as-of" query with Read Committed Isolation Mode.

FIG. 21 is a flow chart of a procedure for performing an "as-of" query for a transaction operating with Read Committed Isolation Mode. With Serializable isolation, further work is needed to produce a Transaction ID and associated Invisibility/Visibility Lists that are consistent with the transaction serialization order. This is performed by first creating a new transaction 200 as described in conjunction with FIG. 20 for Read Committed isolation mode.

The TxMgr 103 modifies the invisibility and visibility lists of the transaction until no further changes are made. At step 2100, the TxMgr 103 removes from the Invisibility List 203 of the new transaction any transactions that were serialized before any transaction currently defined as being visible to the new transaction. At step 2101, the TxMgr 103 adds to the visibility list of the new transaction any transactions that were serialized before any transaction currently defined as being visible to the new transaction.

Figure 22:
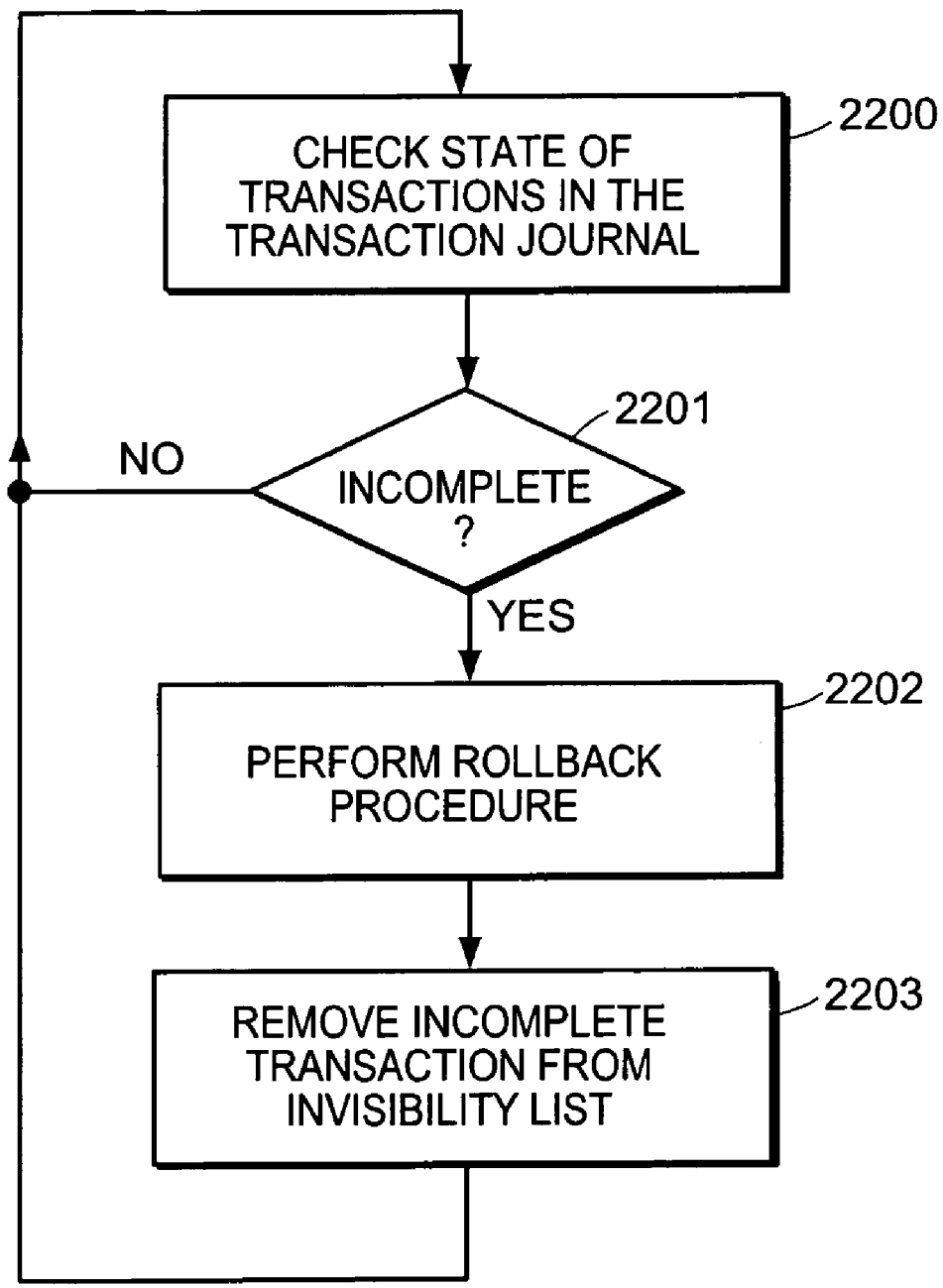
FIG. 22 is a flowchart of a procedure for performing on-line recovery.

FIG. 22 is a flowchart of a procedure for performing on-line recovery. On occasion, a database management system may terminate unexpectedly before active transactions have a chance to either commit or rollback. In this case, changes made by such active transaction are incomplete, and must be rolled back when the system is restarted. The database system allows the recovery of such incomplete transactions to proceed concurrently with new transactions.

Referring to FIG. 22, at step 2200, when the system starts, the TxMgr 103 consults the transaction journal (TxJournal), to determine which transactions were left in an incomplete state. The TxMgr 103 records entries in the TxJournal whenever transactions start, commit or rollback. If a system failure occurs, there may be entries in the journal for transactions that started but did not complete. At step 2201, the TxMgr 103 checks if the transaction is complete. At step 2202, for each incomplete transaction, the TxMgr 103 begins a rollback procedure as described in conjunction with FIG. 15. At step 2203, after the rollback procedure is complete, the TxMgr 103 removes the TIDs of the incomplete transactions from the Invisibility List 203 of any new transactions 200 which it starts. Thus, any new transactions will not "see" the changes made by the incomplete transactions.

In one embodiment, the decision as to whether a given version of information should be visible to a requestor is performed in logic circuits in a Field Programmable Gate Array (FPGA). This determination is a function of the transaction identifier of the requestor, the Invisibility List 203 associated with the request, and the CreatorTID and DeleterTID of the candidate version. The determination is made much more quickly in the FPGA than by executing software instructions stored in memory.

The database system efficiently enforces various transaction isolation levels, performs on-line recovery, performs "as-of" queries, repairs the effects of unwanted transactions, and supports the needs of multi-level security environments. Efficiency is increased through the use of a deleter transaction identifier as well as a creator transaction identifier to identify the range of validity of a version, use of invisibility lists and visibility lists in determining visibility, and use of hardware to compute visibility while data streams off disk into memory.

Most commercial DBMSs provide security through discretionary access control (DAC). Some applications and environments required a more rigorous approach to security, called Multi-Level Security (MLS). MLS allows information to be classified into different levels, such as Public, Secret and Top Secret. Different levels may have different versions of the same information (cover stories). Higher levels are allowed visibility to lower levels, but lower levels should have no visibility to higher levels.

Systems that use locking, rather than visibility, to control concurrency are often unsuitable for MLS environments, because the delay introduced by locking (or deferring commitment), can act as a covert communication channel that enables someone at a higher level to communicate information to someone at a lower level.

The ability of the invention to avoid the delays that can open covert information channels is of interest to MLS environments. The ability of the invention to efficiently control visibility is also of interest to the MLS need to support "cover stories" and other alternative views of reality.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling visibility of data during transaction processing in a multi-version database management system, comprising:

receiving a request for a record stored in a multi-version database from a requesting transaction, the requesting transaction having an associated transaction identifier which uniquely identifies the requesting transaction, a transaction invisibility list which identifies other transactions whose effects are to be invisible to the requesting transaction, and an isolation level which describes whether changes made by other transactions are to be visible to the requesting transaction;

wherein the transaction identifier is a numeric value and transaction identifiers are assigned to transactions in increasing numerical order based on a start time of the transaction, such that a first transaction can be determined to start before a second transaction if the transaction identifier associated with the first transaction is numerically less than the transaction identifier associated with the second transaction; and wherein transaction identifiers associated with transactions that operate in the present have an even numeric value, and transaction identifiers associated with transactions operating "as-of" a specified "as-of" time in the past have an odd numeric value;

wherein the specified "as-of" time is a time in the past that, when used as a argument in an "as-of" query, produces the same results as would have been produced if a query occurred in the past at the specified "as-of" time;

determining whether the record is visible to the requesting transaction based on the isolation level of the requesting transaction, the transaction identifier, the transaction invisibility list of the requesting transaction, and a creator transaction identifier in the requested record which identifies a transaction that created the record;

assigning a Record ID value to the record when the record is first created, the Record ID uniquely distinguishing the record from all other records, and the Record ID preserved across modifications of the record;

finding a transaction identifier for an earliest transaction that started on or after the specified "as-of" time;

creating a new transaction, the new transaction having a start-time equal to the specified "as-of" time, a transaction identifier equal to the transaction identifier for the earliest transaction, minus one, and an isolation level set to Read Committed;

initializing an invisibility list of the new transaction to include the transaction identifiers of all transactions having transaction identifiers less than the transaction identifier for the new transaction and end-times greater than the specified "as-of" time;

removing from the invisibility list of the new transaction, any transactions serialized before transactions visible to the new transaction; and adding to a visibility list of the new transaction, any transactions with transaction identifiers greater than the transaction identifier of the new transaction, that are serialized before transactions visible to the new transaction.

2. The method of claim 1 wherein the requesting transaction further comprises an associated visibility list, the visibility list including numeric transaction identifiers which identify other transactions whose effects are to be visible to the requesting transaction.

3. The method of claim 2 further comprising:

removing a transaction identifier of a committing transaction from an invisibility list of a specified transaction operating with Read Committed isolation, if the transaction identifier of the committing transaction is less than the transaction identifier of the specified transaction; and adding the transaction identifier of the committing transaction to the visibility list of the specified transaction, if the transaction identifier of the committing transaction is greater than the transaction identifier of the specified transaction.

4. The method of claim 3 further comprising:

retrieving visible records for the specified transaction operating with Read Committed isolation, comprising:

reading a record from the database;

ensuring that either (a) the creator transaction identifier of the record is equal to the transaction identifier of the requesting transaction, or (b) the creator transaction identifier of the record is greater than the transaction identifier of the requesting transaction and the creator transaction identifier is on the visibility list of the requesting transaction or (c) the creator transaction identifier of the record is less than the transaction identifier of the requesting transaction and the creator transaction identifier of the record is not on the invisibility list of the requesting transaction;

ensuring that the deleter transaction identifier of the record is either (a) a NULL transaction identifier; or (b) less than the transaction identifier of the requesting transaction and on the invisibility list of the requesting transaction or (c) greater than the transaction identifier of the requesting transaction and not on the visibility list of the requesting transaction; and ensuring that the list of deleted records does not include a description of the record, or that record was deleted by a transaction whose transaction identifier was either (a) less than the transaction identifier of the requesting transaction and also on the invisibility list of the requesting transaction or (b) greater than the transaction identifier of the requesting transaction and not on the visibility list of the requesting transaction.

5. The method of claim 4 further comprising:

avoiding unrepeatable reads comprising:

tracking versions of records retrieved during a transaction;

checking if a different version of a record previously retrieved is subsequently retrieved; and returning the version of the record previously retrieved or aborting the transaction.

6. The method of claim 1 additionally comprising:

initializing the invisibility list of the new transaction by:

searching a list of existing transactions to find transactions whose transaction identifier is less than the transaction identifier of the new transaction, and whose state is an active state; and inserting the transaction identifiers of such existing transactions into the invisibility list of the new transaction.

7. The method of claim 1 further comprising:

allowing a transaction to delete a record, by storing the transaction identifier of the transaction deleting the record in a deleter transaction identifier field of the record.

8. The method of claim 1 further comprising:

allowing a transaction to delete a record, by adding a deletion descriptor to a list of deleted records, the deletion descriptor including the transaction identifier of the transaction performing the deletion and information uniquely identifying the record.

9. The method of claim 1 further providing the ability for a transaction to modify an existing record, comprising:

creating a new record;
copying fields from the existing record to the new record;
storing a transaction identifier identifying the transaction in a creator-transaction-identifier field of the new record;
copying updated data field values in the existing record into corresponding fields in the new record;
storing the transaction identifier of the transaction in a deleter transaction identifier field of the existing record;
adding a deletion descriptor to a list of deleted records if the deleter transaction identifier field is not present, the deletion descriptor identifying the transaction and the existing record; and
storing a NULL transaction identifier value of the transaction performing the modification in a deleter transaction identifier field of the new record.

10. The method of claim 1 further comprising:
retrieving records visible to a transaction operating with Read Uncommitted isolation comprising:
reading a record from the database;
ensuring that the deleter transaction identifier of the record is a NULL transaction identifier; and
ensuring that a list of deleted records does not include a description of the record.

11. The method of claim 1 wherein the step of determining whether the record is visible to the requesting transaction is carried out in a programmable filter.

12. The method of claim 11 wherein the programmable filter is implemented as a circuit component selected from a group consisting of Field Programmable Gate Array (FPGA), Application Specific Integrated Circuit (ASIC), Application Specific Standard Product (ASSP), discrete logic in a printed circuit board, and an programmable micro-processor.

13. The method of claim 1 further comprising:
retrieving a version of a record visible to a requesting transaction without reference to other versions of the record.

14. A method for controlling visibility of data during transaction processing in a multi-version database management system, comprising:
receiving a request for a record stored in the multi-version database from a requesting transaction, the requesting transaction having an associated transaction identifier which uniquely identifies the transaction, a transaction invisibility list which identifies other transactions whose effects are to be invisible to the requesting transaction, and an isolation level which describes whether changes made by other transactions are to be visible to the transaction;
determining whether the record is visible to the requesting transaction based on the isolation level of the requesting transaction, the transaction identifier, the invisibility list of the requesting transaction, and a creator transaction identifier in the requested record which identifies a transaction that created the record; and
rolling back changes of a transaction, comprising:
examining all records created, updated or deleted by the transaction;
storing an aborted transaction identifier in a deleter transaction identifier field of records created by the requesting transaction, the aborted transaction identifier being less than a numeric value of any other non-NULL transaction identifier;
storing a deletion descriptor in a list of deleted records the deletion descriptor including the aborted transaction identifier and information uniquely identifying an associated version of the record;
storing a NULL transaction identifier in the deleter transaction identifier field of records deleted by the requesting transaction;
removing the deletion descriptor from the list of deleted records, the deletion descriptor including the identifier of the requesting transaction; and
writing records with a modified deleter transaction identifier field to a persistent storage device.

15. The method of claim 14 wherein the examining step comprises:
starting the examination at a low-water-mark record and ending the examination at a high-water-mark record for a sequential set of records, the low-water-mark identifying a first record in the sequential set of records created, updated or deleted by the requesting transaction, and the high-water-mark identifying a last record in the sequential set of records created, updated or deleted by the requesting transaction.

16. The method of claim 14 further comprising:
performing online recovery support for transaction processing, comprising:
determining a set of transactions that had started, but had neither committed nor aborted at a time the database had previously stopped operating;
rolling back changes made to records for each such incomplete transaction; and
including the transaction identifiers of each such incomplete transaction on an invisibility list of all new transactions started before the incomplete transactions have been rolled back.

17. The method of claim 14 further comprising:
creating a new record by:
obtaining a unique Record ID for the new record;
storing the transaction identifier of the transaction creating the new record and the Record ID in the new record; and
storing a NULL transaction identifier value in a deleter transaction identifier field of the new record.

18. A method for controlling visibility of data during transaction processing in a multi-version database management system, comprising:
receiving a request for a record stored in the multi-version database from a requesting transaction, the requesting transaction having an associated transaction identifier which uniquely identifies the transaction, a transaction invisibility list which identifies other transactions whose effects are to be invisible to the requesting transaction, and an isolation level which describes whether changes made by other transactions are to be visible to the transaction;
determining whether the record is visible to the requesting transaction based on the isolation level of the requesting transaction, the transaction identifier of the requesting transaction, the invisibility list of the requesting transaction, and a creator transaction identifier in the requested record which identifies a transaction that created the record; and
retrieving visible records for a requesting transaction operating with Repeatable Read isolation comprising:
reading a record from the database;
ensuring that the creator transaction identifier of the record is not on the invisibility list of the requesting transaction and has a value less than or equal to the transaction identifier of the requesting transaction;

ensuring that a deleter transaction identifier of the record is a NULL transaction identifier, or is greater than the transaction identifier of the requesting transaction, or is both less than the transaction identifier of the requesting transaction and is stored on the invisibility list of the requesting transaction; and ensuring that a list of deleted records does not include a description of the record, or that the record was deleted by a transaction whose transaction identifier was greater than the transaction identifier of the requesting transaction, or that the record was deleted by a transaction whose transaction identifier is both less than the transaction identifier of the requesting transaction and is stored on the invisibility list of the requesting transaction.

19. The method of claim 18 wherein records that are not visible to the requesting transaction, but that otherwise would meet the restrictions imposed by a database query, are flagged as being invisible and temporarily retained in memory.

20. A computer readable storage medium containing instructions readable by a computer to configure the computer to control visibility of data during transaction processing in a multi-version database management system comprising:

a requesting transaction requesting a record stored in a multi-version database, comprising:

an associated transaction identifier which uniquely identifies the requesting transaction;

wherein the transaction identifier is a numeric value and transaction identifiers are assigned to transactions in increasing numerical order based on a start time of the transaction, such that a first transaction can be determined to start before a second transaction if the transaction identifier associated with the first transaction is numerically less than the transaction identifier associated with the second transaction;

wherein transaction identifiers associated with transactions that operate in the present have an even numeric value, and transaction identifiers associated with transactions operating "as-of" a specified "as-of" time in the past have an odd numeric value;

wherein the specified "as-of" time is a time in the past that, when used as a argument in an "as-of" query, produces the same results as would have been produced if a query occurred in the past at the specified "as-of" time;

a transaction invisibility list which identifies other transactions whose effects are to be invisible to the requesting transaction; and an isolation level which describes whether changes made by other transactions are to be visible to the requesting transaction;

a transaction manager which receives a request for a record from the requesting transaction and determines whether the record is visible to the requesting transaction based on the isolation level of the requesting transaction, the transaction identifier, the transaction invisibility list of the requesting transaction, and a creator transaction identifier in the requested record which identifies a transaction that created the record;

a Record ID manager which assigns a Record ID value to the record when the record is first created, the Record ID uniquely distinguishing the record from all other records, and the Record ID preserved across modifications of the record;

wherein the transaction manager finds a transaction identifier for an earliest transaction that started on or after the specified "as-of" time, creates a new transaction, the new transaction having a start-time equal to the specified "as-of" time, a transaction identifier equal to the transaction identifier for the earliest transaction, minus one, and an isolation level set to Read Committed; and initializes an invisibility list of the new transaction to include the transaction identifiers of all transactions having transaction identifiers less than the transaction identifier for the new transaction and end-times greater than the specified "as-of" time; and wherein the transaction manager removes from the invisibility list of the new transaction, any transactions serialized before transactions visible to the new transaction and adds to a visibility list of the new transaction, any transactions with transaction identifiers greater than the transaction identifier of the new transaction, that are serialized before transactions visible to the new transaction.

21. The computer readable storage medium of claim 20 wherein the requesting transaction further comprises:

an associated visibility list, the visibility list including numeric transaction identifiers which identify other transactions whose effects are to be visible to the requesting transaction.

22. The computer readable storage medium of claim 21 wherein the transaction manager removes a transaction identifier of a committing transaction from an invisibility list of a specified transaction operating with Read Committed isolation if the transaction identifier of the committing transaction is less than the transaction identifier of the specified transaction; and adds the transaction identifier of the committing transaction to the visibility list of the specified transaction, if the transaction identifier of the committing transaction is greater than the transaction identifier of the specified transaction.

23. The computer readable storage medium of claim 22 wherein to retrieve visible records for the specified transaction operating with Read Committed isolation, the transaction manager reads a record from the database;

ensures that either (a) the creator transaction identifier of the record is equal to the transaction identifier of the requesting transaction, or (b) the creator transaction identifier of the record is greater than the transaction identifier of the requesting transaction and the creator transaction identifier is on the visibility list of the requesting transaction or (c) the creator transaction identifier of the record is less than the transaction identifier of the requesting transaction and the creator transaction identifier of the record is not on the invisibility list of the requesting transaction;

ensures that the deleter transaction identifier of the record is either (a) a NULL transaction identifier; or (b) less than the transaction identifier of the requesting transaction and on the invisibility list of the requesting transaction or (c) greater than the transaction identifier of the requesting transaction and not on the visibility list of the requesting transaction; and ensures that the list of deleted records does not include a description of the record, or that record was deleted by a transaction whose transaction identifier was either (a) less than the transaction identifier of the requesting transaction and also on the invisibility list of the requesting transaction or (b) greater than the transaction identifier of the requesting transaction and not on the visibility list of the requesting transaction.

24. The computer readable storage medium of claim 23 wherein to avoid unrepeatable reads, the transaction manager tracks versions of records retrieved during a transaction, checks if a different version of a record previously retrieved is subsequently retrieved and returns the version of the record previously retrieved or aborting the transaction.

25. The computer readable storage medium of claim 20 wherein to initialize the invisibility list of the new transaction, the transaction manager searches a list of existing transactions to find transactions whose transaction identifier is less than the transaction identifier of the new transaction, and whose state is an active state and inserts the transaction identifiers of such existing transactions into the invisibility list of the new transaction.

26. The computer readable storage medium of claim 20 wherein the transaction manager stores the transaction identifier of the transaction deleting a record in a deleter transaction identifier field of the record to allow a transaction to delete the record.

27. The computer readable storage medium of claim 20 wherein the transaction manager adds a deletion descriptor to a list of deleted records, the deletion descriptor including the transaction identifier of the transaction performing the deletion and information uniquely identifying the record to allow a transaction to delete a record.

28. The computer readable storage medium of claim 20 wherein to modify an existing record, the transaction manager
 requests a Query execution manager to create a new record,
 copies fields from the existing record to the new record,
 stores a transaction identifier identifying the transaction in a creator-transaction-identifier field of the new record,
 copies updated data field values in the existing record into corresponding fields in the new record,
 stores the transaction identifier of the transaction in a deleter transaction identifier field of the existing record,
 adds a deletion descriptor to a list of deleted records if the deleter transaction identifier field is not present, the deletion descriptor identifying the transaction and the existing record, and
 stores a NULL transaction identifier value of the transaction performing the modification in a deleter transaction identifier field of the new record.

29. The computer readable storage medium of claim 20 wherein, to retrieve records visible to a transaction operating with Read Uncommitted isolation, the transaction manager reads a record from the database, ensures that the deleter transaction identifier of the record is a NULL transaction identifier and ensures that a list of deleted records does not include a description of the record.

30. The computer readable storage medium of claim 20 further comprising:
 a programmable filter which determines whether the record is visible to the requesting transaction.

31. The computer readable storage medium of claim 30 wherein the programmable filter is implemented as a circuit component selected from a group consisting of Field Programmable Gate Array (FPGA), Application Specific Integrated Circuit (ASIC), Application Specific Standard Product (ASSP), discrete logic in a printed circuit board, and an programmable micro-processor.

32. The computer readable storage medium of claim 20 wherein the transaction manager retrieves a version of a record visible to a requesting transaction without reference to other versions of the record.

33. A computer readable storage medium containing instructions readable by a computer to configure the computer to control visibility of data during transaction processing in a multi-version database management system comprising:
 a requesting transaction requesting a record stored in a multi-version database comprising:
  an associated transaction identifier which uniquely identifies the requesting transaction;
  a transaction invisibility list which identifies other transactions whose effects are to be invisible to the requesting transaction; and
  an isolation level which describes whether changes made by other transactions are to be visible to the requesting transaction;
 a transaction manager which receives a request for a record from the requesting transaction and determines whether the record is visible to the requesting transaction based on the isolation level of the requesting transaction, the transaction identifier, the invisibility list of the requesting transaction, and a creator transaction identifier in the requested record which identifies a transaction that created the record. wherein to roll back changes of a transaction the transaction manager;
 wherein to roll back changes of a transaction the transaction manager:
  examines all records created, updated or deleted by the transactions;
  stores an aborted transaction identifier in a deleter transaction identifier field of records created by the requesting transaction, the aborted transaction identifier is less than a numeric value of any other non-NULL transaction identifier;
  stores a deletion descriptor in a list of deleted records the deletion descriptor including the aborted transaction identifier and information uniquely identifying an associated version of the record;
  stores a NULL transaction identifier in the deleter transaction identifier field of records deleted by the requesting transaction;
  removes the deletion descriptor from the list of deleted records, the deletion descriptor including the identifier of the requesting transaction; and
  writes records with a modified deleter transaction identifier field to a persistent storage device.

34. The computer readable storage medium of claim 33 wherein to examine all records, the transaction manager starts the examination at a low-water-mark record and ending the examination at a high-water-mark record for a sequential set of records, the low-water-mark identifying a first record in the sequential set of records created, updated or deleted by the requesting transaction, and the high-water-mark identifying a last record in the sequential set of records created, updated or deleted by the requesting transaction.

35. The computer readable storage medium of claim 33 wherein to perform online recovery support for transaction processing, the transaction manager
 determines a set of transactions that had started, but had neither committed nor aborted at a time the database had previously stopped operating, rolls back changes made to records for each such incomplete transactions, and includes the transaction identifiers of each such incomplete transaction on an invisibility list of all new transactions started before the incomplete transactions have been rolled back.

36. The computer readable storage medium of claim 33 wherein, to create a new record, a Query Execution manager obtains a unique Record ID for the new record from the RecordID manager, stores the transaction identifier of the transaction creating the new record and the Record ID in the new record and stores a NULL transaction identifier value in a deleter transaction identifier field of the new record.

37. A computer readable storage medium containing instructions readable by a computer to configure the computer to control visibility of data during transaction processing in a multi-version database management system comprising:

a requesting transaction requesting a record stored in a multi-version database comprising:
  an associated transaction identifier which uniquely identifies the requesting transaction;
  a transaction invisibility list which identifies other transactions whose effects are to be invisible to the requesting transaction; and
  an isolation level which describes whether changes made by other transactions are to be visible to the requesting transaction;
a transaction manager which receives a request for a record from the requesting transaction and determines whether the record is visible to the requesting transaction based on the isolation level of the requesting transaction, the transaction identifier of the requesting transaction, the invisibility list of the requesting transaction, and a creator transaction identifier in the requested record which identifies a transaction that created the record;
wherein to retrieve visible records for a requesting transaction operating with Repeatable Read isolation, the transaction manager
  reads a record from the database and ensures that the creator transaction identifier of the record is not on the invisibility list of the requesting transaction and has a value less than or equal to the transaction identifier of the requesting transaction,
  ensures that a deleter transaction identifier of the record is a NULL transaction identifier, or is greater than the transaction identifier of the requesting transaction, or is both less than the transaction identifier of the requesting transaction and is stored on the invisibility list of the requesting transaction and
  ensures that a list of deleted records does not include a description of the record, or that the record was deleted by a transaction whose transaction identifier was greater than the transaction identifier of the requesting transaction, or that the record was deleted by a transaction whose transaction identifier is both less than the transaction identifier of the requesting transaction and is stored on the invisibility list of the requesting transaction.

38. The computer readable storage medium of claim 37 wherein records that are not visible to the requesting transaction, but that otherwise would meet the restrictions imposed by a database query, are flagged as being invisible and temporarily retained in memory.

39. A computer readable storage medium containing instructions readable by a computer to configure the computer to control visibility of data during transaction processing in a multi-version database management system comprising:

means for receiving a request for a record stored in a multi-version database from a requesting transaction, the requesting transaction having an associated transaction identifier which uniquely identifies the requesting transaction, a transaction invisibility list which identifies other transactions whose effects are to be invisible to the requesting transaction, and an isolation level which describes whether changes made by other transactions are to be visible to the requesting transaction;
  wherein the transaction identifier is a numeric value and transaction identifiers are assigned to transactions in increasing numerical order based on a start time of the transaction, such that a first transaction can be determined to start before a second transaction if the transaction identifier associated with the first transaction is numerically less than the transaction identifier associated with the second transaction;
  wherein transaction identifiers associated with transactions that operate in the present have an even numeric value, and transaction identifiers associated with transactions operating "as-of" a specified "as-of" time in the past have an odd numeric value;
    wherein the specified "as-of" time is a time in the past that, when used as a argument in an "as-of" query, produces the same results as would have been produced if a query occurred in the past at the specified "as-off" time;
means for determining whether the record is visible to the requesting transaction based on the isolation level of the requesting transaction, the transaction identifier, the transaction invisibility list of the requesting transaction, and a creator transaction identifier in the requested record which identifies a transaction that created the record;
means for assigning a Record ID value to the record when the record is first created, the Record ID uniquely distinguishing the record from all other records, and the Record ID preserved across modifications of the record;
means for finding a transaction identifier for an earliest-transaction that started on or after the specified "as-of" time;
means for creating a new transaction, the new transaction having a start-time equal to the specified "as-of" time; a transaction identifier equal to the transaction identifier for the earliest transaction, minus one; and an isolation level set to Read Committed;
means for initializing an invisibility list of the new transaction to include the transaction identifiers of all transactions having transaction identifiers less than the transaction identifier for the new transaction and end-times greater than the specified "as-of" time;
means for receiving a request for a record from a requesting transaction, the requesting transaction having an associated transaction identifier which uniquely identifies the transaction, an invisibility list which identifies other transactions whose effects are to be invisible to the requesting transaction, and an isolation level which describes whether changes made by other transactions are to be visible to the transaction; and means for determining whether the record is visible to the requesting transaction based on the isolation level of the requesting transaction, the transaction identifier, the invisibility list of the requesting transaction, and a creator transaction identifier in the requested record which identifies a transaction that created the record.

* * * * *